United States Patent
Li et al.

(10) Patent No.: US 8,006,021 B1
(45) Date of Patent: Aug. 23, 2011

(54) PROCESSOR LOCAL BUS BRIDGE FOR AN EMBEDDED PROCESSOR BLOCK CORE IN AN INTEGRATED CIRCUIT

(75) Inventors: Kam-Wing Li, San Jose, CA (US); Jeffery H. Appelbaum, San Mateo, CA (US); Ahmad R. Ansari, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 181 days.

(21) Appl. No.: 12/057,326

(22) Filed: Mar. 27, 2008

(51) Int. Cl.
*G06F 13/36* (2006.01)

(52) U.S. Cl. ........ 710/306; 710/110; 710/305; 710/307; 710/317

(58) Field of Classification Search ............... 710/58, 710/60, 66, 110, 305–307, 317; 709/232–234
See application file for complete search history.

(56) References Cited

U.S. PATENT DOCUMENTS

| | | | | |
|---|---|---|---|---|
| 4,346,377 A | * | 8/1982 | Green | 345/472 |
| 5,590,304 A | * | 12/1996 | Adkisson | 711/100 |
| 6,101,565 A | * | 8/2000 | Nishtala et al. | 710/307 |
| 6,208,667 B1 | * | 3/2001 | Caldara et al. | 370/503 |
| 6,275,890 B1 | * | 8/2001 | Lee et al. | 710/317 |
| 6,502,173 B1 | * | 12/2002 | Aleksic et al. | 711/168 |
| 6,546,451 B1 | * | 4/2003 | Venkataraman et al. | 710/317 |
| 6,640,275 B1 | * | 10/2003 | Kincaid | 710/305 |
| 6,760,802 B2 | * | 7/2004 | Jahnke et al. | 710/305 |
| 6,940,311 B2 | * | 9/2005 | Saitoh | 326/86 |
| 6,985,988 B1 | | 1/2006 | Nsame | |
| 7,076,595 B1 | * | 7/2006 | Dao et al. | 710/317 |
| 7,174,403 B2 | * | 2/2007 | Ganasan | 710/113 |
| 7,185,121 B2 | * | 2/2007 | Fitzsimmons et al. | 710/26 |
| 7,219,177 B2 | * | 5/2007 | Chang et al. | 710/110 |
| 7,234,011 B2 | * | 6/2007 | Chae | 710/110 |
| 7,266,632 B2 | * | 9/2007 | Dao et al. | 710/317 |
| 7,275,120 B2 | * | 9/2007 | Ou et al. | 710/58 |
| 7,277,976 B2 | * | 10/2007 | Hoshi et al. | 710/317 |
| 7,373,450 B2 | * | 5/2008 | Kamegawa | 710/316 |
| 7,426,600 B2 | * | 9/2008 | Takaba | 710/316 |
| 7,461,187 B2 | * | 12/2008 | Morishita et al. | 710/60 |
| 7,526,595 B2 | * | 4/2009 | Drerup et al. | 710/311 |
| 7,554,355 B2 | * | 6/2009 | Chang et al. | 326/38 |
| 2003/0191891 A1 | * | 10/2003 | Tanaka et al. | 711/114 |

(Continued)

OTHER PUBLICATIONS

Drake et al. Panic! Unix System Crash Dump Analysis. Chapter 15. Section "Basic CPU Structure" (all CPUs are similar). 1995.*

(Continued)

*Primary Examiner* — Matthew Spittle
(74) *Attorney, Agent, or Firm* — W. Eric Webostad; John J. King

(57) ABSTRACT

A processor local bus bridge for a processor block ASIC core for embedding in an IC is described. A core logic-to-core logic bridge includes a slave processor local bus interface, a crossbar switch coupled to the slave processor local bus interface and a master processor local bus interface coupled to the crossbar switch. The slave processor local bus interface and the master processor local bus interface are coupled to one another via the crossbar switch for bidirectional communication between a first and a second portion of core logic. The bridge provides rate adaptation for bridging for use of a frequency of operation associated with the crossbar switch which has substantially greater frequencies of operation than those associated with the core logic sides of the master and slave processor local bus interfaces.

19 Claims, 14 Drawing Sheets

U.S. PATENT DOCUMENTS

2004/0123036 A1* 6/2004 Hammitt et al. ............... 711/131
2005/0273544 A1* 12/2005 Fitzsimmons et al. ........ 710/317
2007/0283077 A1* 12/2007 Klein et al. ................... 711/100

OTHER PUBLICATIONS

Altera Corporation. Avalon Memory-Mapped Design Optimizations. Embedded Design Handbook. Jun. 2008.*

Taylor et al. 28nm Generation Programmable Families. Xilinx. Aug. 8, 2010.*

Bafumba-Lokilo et al. Generic Crossbar Network on Chip for FPGA MPSoCs. IEEE. 2008.*

Hauck et al. Mesh Routing Topologies for Multi-FPGA Systems. IEEE Transactions on VLSI Systems. vol. 6. No. 3. pp. 400-408. Sep. 1998.*

U.S. Appl. No. 12/043,097, filed Mar. 5, 2008, Ansari, Ahmad R., et al., entitled "A Processor Block Asic Core for Embedding in an Integrated Circuit", Xilinx, Inc. 2100 Logic Drive, San Jose, California 95124.

IBM Doc. No. SA-14-2538-04, "128-bit Processor Local Bus Architecture Specifications", Ver. 4.6, Jul. 2004, 184 pages.

UG200 (v1.0), "Embedded Processor Block in Virtex-5 FPGAs", Jan. 15, 2008, 323 pages, Xilinx, Inc. 2100 Logic Drive, San Jose, CA 95124.

UG200 (v1.1), "Embedded Processor Block in Virtex-5 FPGAs", Mar. 31, 2008, 327 pages, Xilinx, Inc. 2100 Logic Drive, San Jose, CA 95124.

* cited by examiner

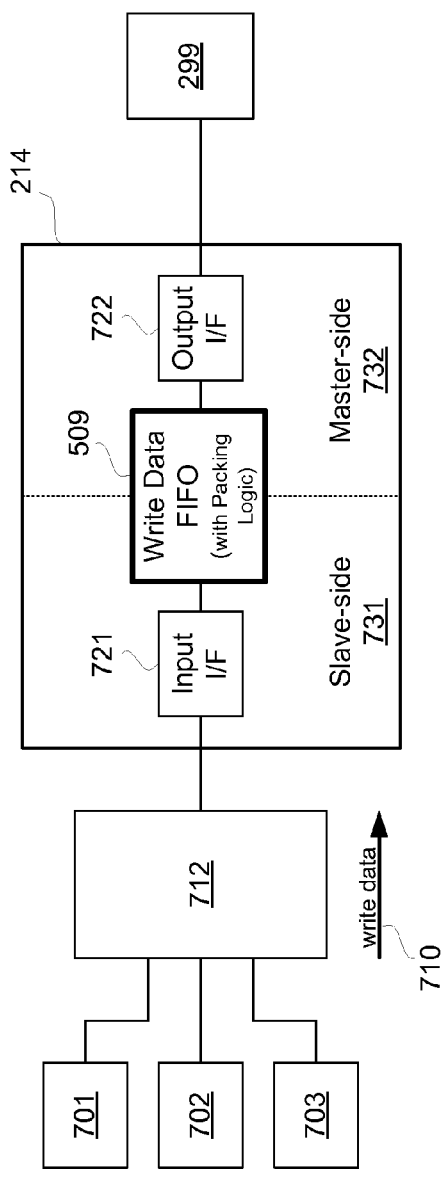
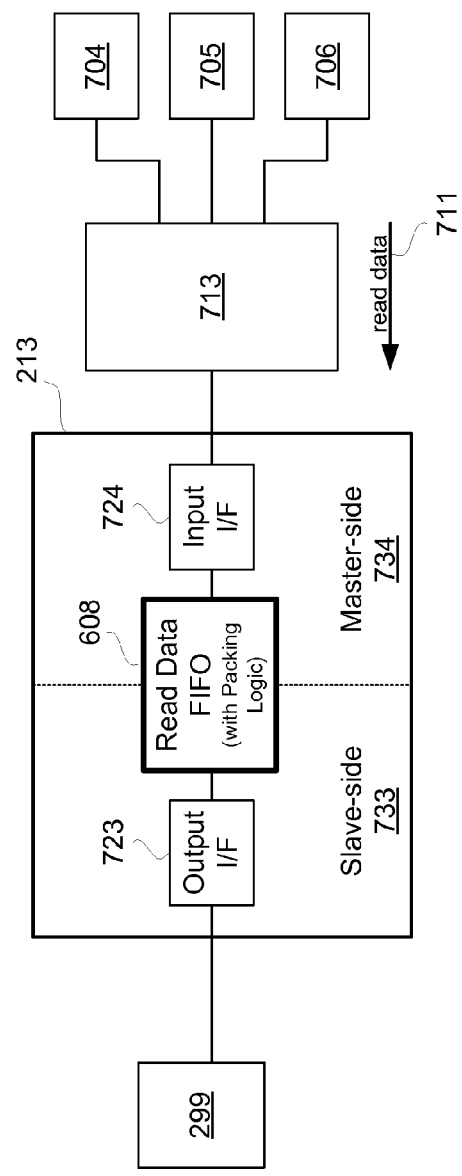
FIG. 7A
FIG. 7B

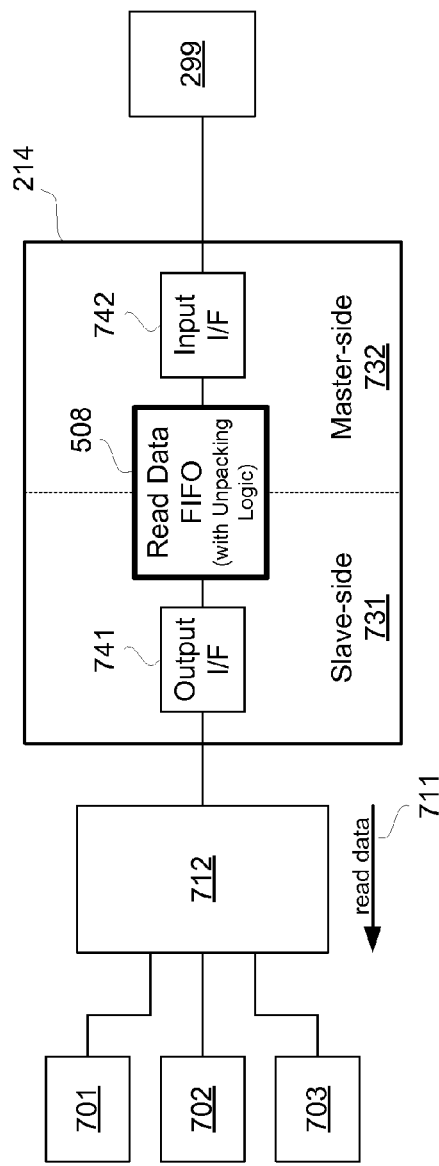
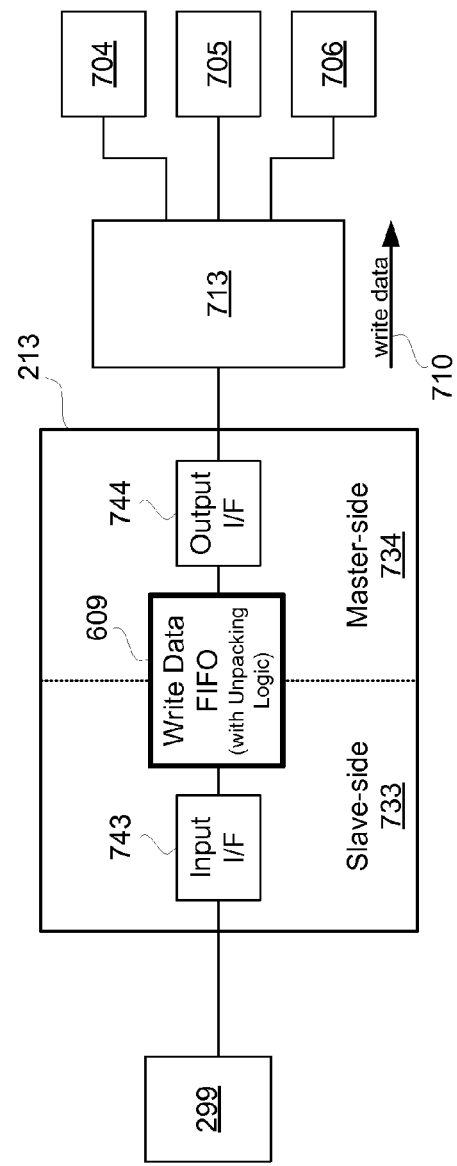
FIG. 7C
FIG. 7D

PROCESSOR LOCAL BUS BRIDGE FOR AN EMBEDDED PROCESSOR BLOCK CORE IN AN INTEGRATED CIRCUIT

FIELD OF THE INVENTION

The invention relates to integrated circuit devices ("ICs"). More particularly, one or more aspects generally relate to a processor local bus bridge for an embedded processor block core in an IC.

BACKGROUND OF THE INVENTION

Programmable logic devices ("PLDs") are a well-known type of integrated circuit that can be programmed to perform specified logic functions. One type of PLD, the field programmable gate array ("FPGA"), conventionally includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile conventionally includes both programmable interconnect and programmable logic. The programmable interconnect conventionally includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic conventionally may be programmed by loading a stream of configuration data into internal configuration memory cells that define how the programmable elements are configured. The configuration data can be read from memory (e.g., from an external non-volatile memory, such as flash memory or read-only memory) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is conventionally stored on-chip in non-volatile memory. In some CPLDs, configuration data is stored on-chip in non-volatile memory, then downloaded to volatile memory as part of an initial configuration ("programming") sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Conventionally, embedded processors are designed apart from the PLDs. Such embedded processors are generally not specifically designed for implementation in PLDs, and thus such embedded processors may have operating frequencies that significantly exceed a maximum operating frequency of programmable logic of such PLDs. Moreover, parameters such as latency, transistor gate delay, data throughput, and the like designed into the embedded processors may be assumed to be present in the environment to which the embedded processors are to be coupled. Thus, even though a PLD may include an embedded processor, such one or more operating parameters of the embedded processor may be substantially disparate from those of programmable logic of the PLD.

For purposes of clarity by way of example and not limitation, an FPGA with an embedded processor is described; however, it should be appreciated that other PLDs, as well as other integrated circuits with programmable logic or other circuitry fabric with less performance than the embedded processor, may likewise be used in accordance with the following description.

Performance of a design instantiated in programmable logic of an FPGA ("FPGA fabric") coupled to an embedded processor may be significantly limited by disparity between operating parameters of the FPGA fabric and those of the embedded processor. Thus, if, as in the past, embedded processor interfaces such as processor local bus ("PLB") interfaces are brought directly out to FPGA fabric, disparity between respective operating parameters of the embedded processor and the FPGA fabric is a significant limitation with respect to overall performance. For example, operations between a memory controller instantiated in FPGA fabric and an embedded processor have heretofore been significantly bottlenecked due to having to wait on the slower memory controller.

Alternatively, to enhance performance, a memory controller instantiated in FPGA fabric may be hardened or provided as an ASIC core coupled to the embedded processor. Hardening a circuit instantiated in FPGA fabric generally means replacing or bypassing configuration memory cells with hard-wired or dedicated connections. Even though the example of a memory controller is used, it should be understood that other peripherals may be hardened or provided as ASIC cores for coupling to an embedded processor. However, as the memory controller or peripheral ASIC or hardened core is not configurable, this reduces overall flexibility. For purposes of clarity by way of example and not limitation, ASIC cores are described even though hardened cores instantiated in FPGA fabric may also be used.

Semiconductor processes and semiconductor process integration rules ("semiconductor process design rules") associated with ASICs are generally more challenging than those associated with FPGAs, and thus yield for such ASICs may be relatively low as compared to yield of FPGAs. FPGAs, which may have a larger and longer run rate than ASICs, may employ semiconductor process design rules that are less aggressive but are more conducive to a higher die per wafer yield than that of ASICs.

It should be understood that an FPGA manufactured with an ASIC core uses FPGA semiconductor process design rules. Thus, ASIC cores manufactured in FPGAs perform worse than such ASIC cores manufactured as standalone ASICs using more aggressive ASIC semiconductor process design rules. Thus, manufacturing FPGAs with ASIC cores conventionally will not achieve competitive performance with standalone ASICs.

For FPGAs provided with ASIC cores that take the place of some FPGA fabric resources, users conventionally are locked into the particular offering of ASIC core memory controllers or peripherals, and have less flexibility of design due to fewer FPGA fabric resources for implementing their circuit design. This loss of flexibility, combined with the fact that such ASIC core memory controllers or peripherals implemented in FPGA fabric, may make FPGAs less attractive to users.

Accordingly, it would be desirable and useful to enhance performance of FPGAs without a significant loss of design flexibility associated with adding ASIC cores for memory controllers or peripherals.

SUMMARY OF THE INVENTION

One or more aspects of the invention generally relate to a processor local bus bridge for a processor block Application Specific Integrated Circuit ("ASIC") core for embedding in an IC having programmable logic.

An aspect of the invention relates generally to a core logic-to-core logic bridge, including a slave processor local bus interface, a crossbar switch coupled to the slave processor local bus interface, and a master processor local bus interface coupled to the crossbar switch. The slave processor local bus interface, the crossbar switch, and the master processor local bus interface are all part of an embedded core of a host integrated circuit having core logic. The slave processor local bus interface has a slave-side portion coupled to a first portion of the core logic. The slave processor local bus interface further has a master-side portion coupled to the crossbar switch. The master processor local bus interface has a slave-side portion coupled to the crossbar switch. The master processor local bus interface further has a master-side portion coupled to a second portion of the core logic. The slave processor local bus interface and the master processor local bus interface are coupled to one another via the crossbar switch for bidirectional communication between the first portion of the core logic and the second portion of the core logic to provide the bridge. The master-side portion of the slave processor local bus interface, the crossbar switch, and the slave-side portion of the master processor local bus interface are configured to operate at a first frequency of operation. The master-side portion of the master processor local bus interface is configured to operate at a second frequency of operation that is a first fraction of the first frequency of operation. The slave-side portion of the slave processor local bus interface is configured to operate at a third frequency of operation that is a second fraction of the first frequency of operation. The bridge provides rate adaptation for bridging for use of the first frequency of operation which is substantially greater than both the second frequency of operation and the third frequency of operation.

Another aspect of the invention relates generally to a method for address mapping. An address is sent from a master device to a slave processor local bus. The address is received to a slave-side portion of the slave processor local bus interface. It is determined that the address is for the slave processor local bus interface. A memory space is segmented into respective segments. The address is address mapped to at least a portion of a segment of the memory space. The address mapping includes: storing template values in a template selection register; selecting a template value from the stored template values responsive to a portion of the address; selecting an address mapping register from address mapping registers responsive to the template value selected, the template value indicating the segment; and obtaining register values from the address mapping register selected to determine at least one section of the segment selected to which the address is mapped.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

FIGS. 7A through 7D are respective block diagrams depicting exemplary embodiments of FPGA fabric-to-crossbar bridging with respect to FIGS. 7A and 7C, and crossbar-to-FPGA fabric bridging with respect to FIGS. 7B and 7D.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
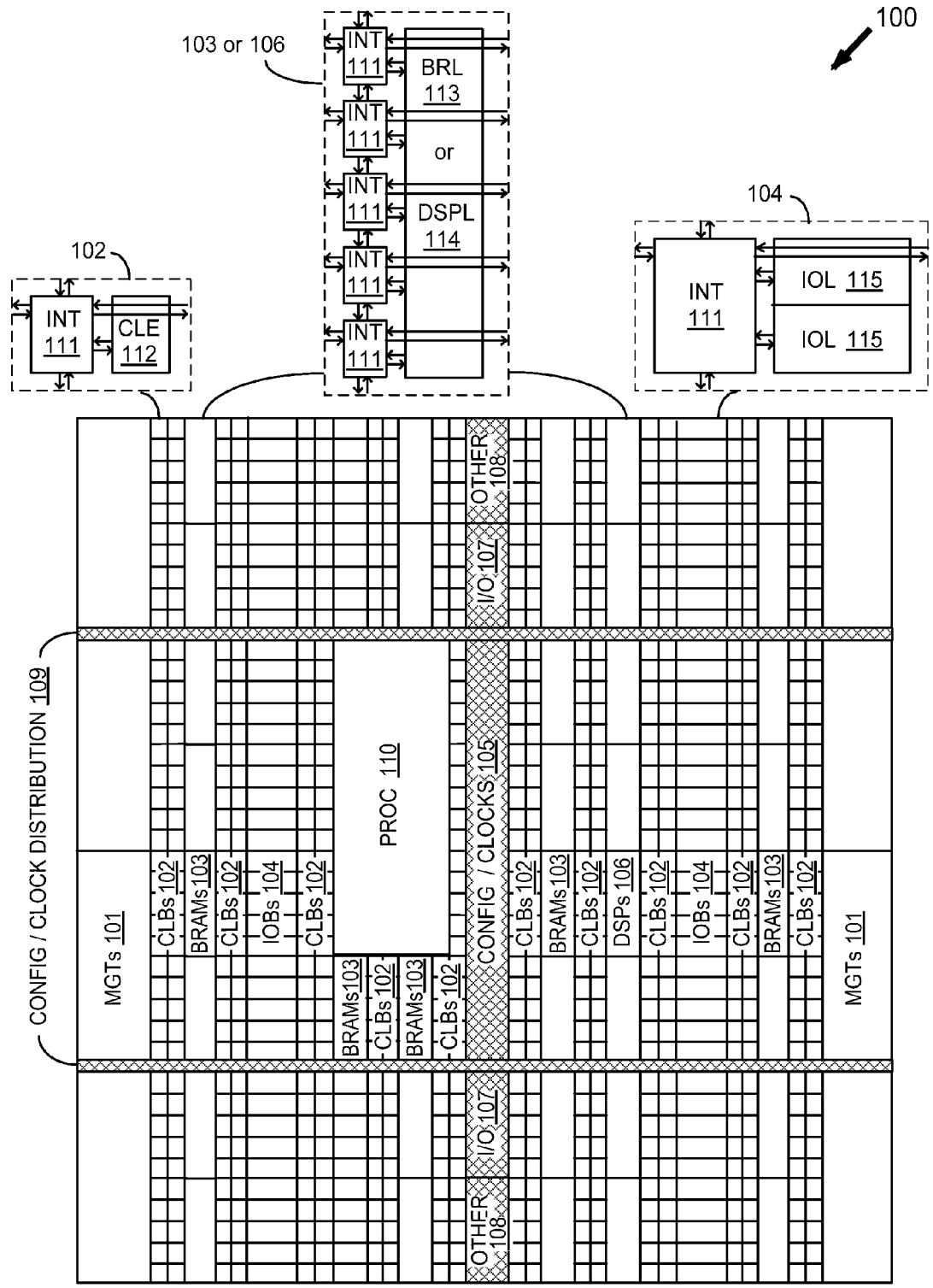
FIG. 1 is a simplified block diagram depicting an exemplary embodiment of a columnar Field Programmable Gate Array ("FPGA") architecture in which one or more aspects of the invention may be implemented.

As noted above, advanced FPGAs can include several different types of programmable logic blocks in the array. For example, FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element in each adjacent tile. Therefore, the programmable interconnect elements taken together implement the programmable interconnect structure for the illustrated FPGA. The programmable interconnect element 111 also includes the connections to and from the programmable logic element within the same tile, as shown by the examples included at the top of FIG. 1.

For example, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the pictured embodiment, a columnar area near the center of the die (shown in FIG. 1) is used for configuration, clock, and other control logic. Horizontal areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, processor block 110 spans several columns of CLBs and BRAMs.

Note that FIG. 1 is intended to illustrate only an exemplary FPGA architecture. For example, the numbers of logic blocks in a column, the relative width of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic, but the number of adjacent CLB columns varies with the overall size of the FPGA.

As FPGA designs increase in complexity, they reach a point at which the designer cannot deal with the entire design at the gate level. Where once a typical FPGA design comprised perhaps 5,000 gates, FPGA designs with over 100,000 gates are now common. To deal with this complexity, circuits are typically partitioned into smaller circuits that are more easily handled. Often, these smaller circuits are divided into yet smaller circuits, imposing on the design a multi-level hierarchy of logical blocks.

Libraries of pre-developed blocks of logic have been developed that can be included in an FPGA design. Such library modules include, for example, adders, multipliers, filters, and other arithmetic and DSP functions from which complex designs can be readily constructed. These pre-developed logic blocks are in the form of coded text that may be instantiated in programmable logic of the FPGA. The use of pre-developed logic blocks permits faster design cycles, by eliminating the redesign of duplicated circuits. Further, such blocks are typically well tested, thereby making it easier to develop a reliable complex design.

Thus, some FPGAs, such as the Virtex-5™ FPGA available from Xilinx, Inc. of San Jose, Calif., can be programmed to incorporate pre-developed logic blocks with pre-designed functionalities, i.e., "soft cores." A soft core can include a predetermined set of configuration bits that program the FPGA to perform one or more functions. Alternatively, a soft core can include source code or schematics that describe the logic and connectivity of a design. Typical soft cores can provide, but are not limited to, DSP functions, memories, storage elements, and math functions. Some soft cores include an optimally floor-planned layout targeted to a specific family of FPGAs. Soft cores can also be parameterizable, i.e., allowing the user to enter parameters to activate or change certain soft core functionality.

A set or sets of configuration bits used to program programmable logic of an FPGA is conventionally referred to as a configuration bitstream. Programmable logic of an FPGA may include CLBs, PIPs, IOBs, or other programmably configurable logic blocks, interconnects, or inputs/outputs by a configuration bitstream. Register settings may be set via a configuration bitstream; however, hardwired registers generally are not programmable logic.

Moreover, a hardwired core (or "hard core"), such as an ASIC core, is not a soft core. A soft core is instantiated in programmable logic after manufacture of an integrated circuit, whereas a hardwired core is manufactured as part of an integrated circuit. Furthermore, conventionally a hardwired core is thought of as having generally dedicated logic blocks, interconnects, and inputs/outputs, even though a portion of a hardwired core may be set to operate responsive to register settings or other storage. Thus, core logic may be either a hard core, a soft core, or a combination of a hard core and a soft core.

Figure 2:
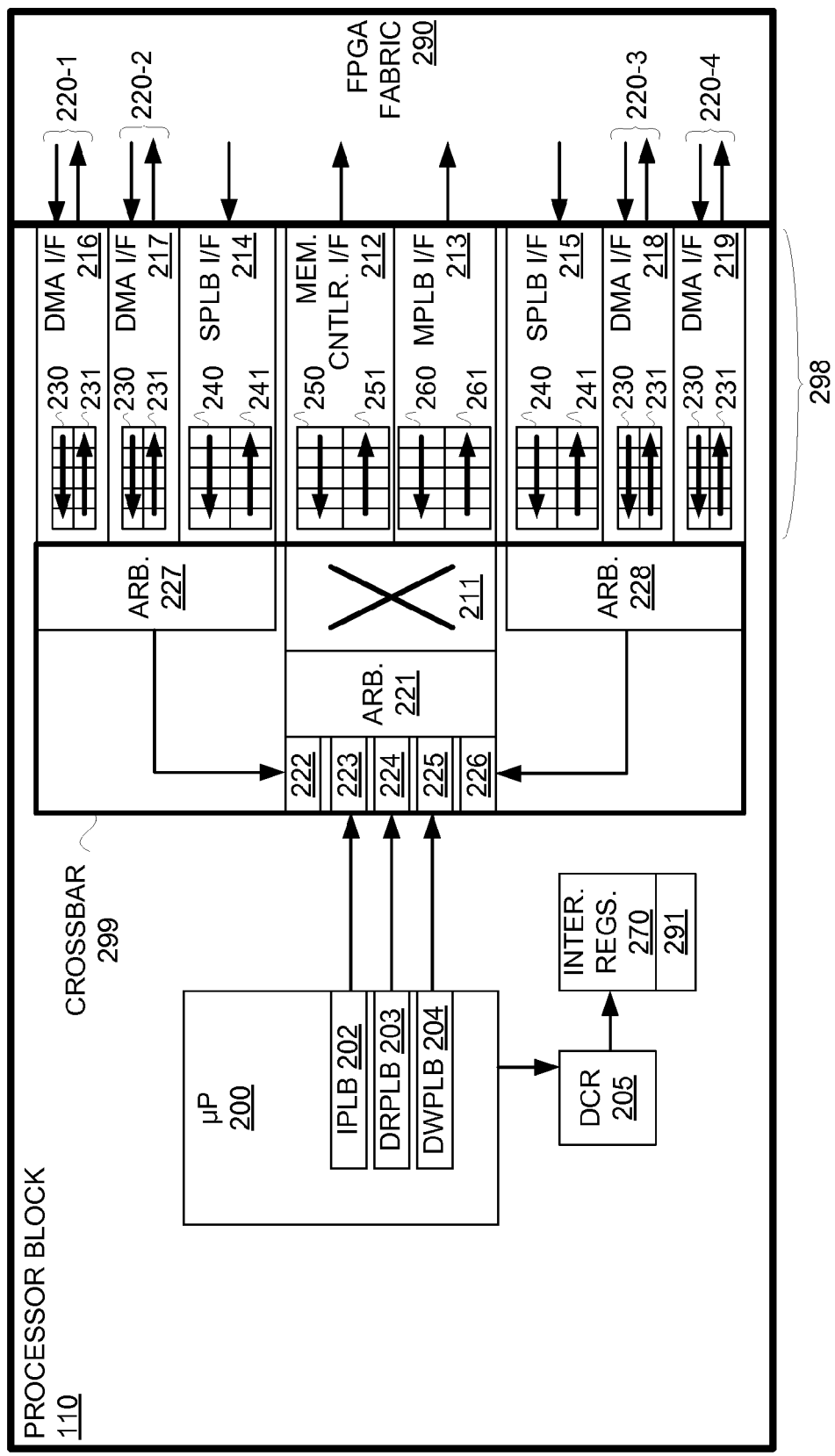
FIG. 2 is a block diagram depicting an exemplary embodiment of an Application Specific Integrated Circuit ("ASIC") processor block core ("processor block").

FIG. 2 is a block diagram depicting an exemplary embodiment of an ASIC processor block core ("processor block") 110. Processor block 110 includes an embedded microprocessor core, namely microprocessor 200, which is generally hardwired and designed apart from the FPGA, such as FPGA 100 of FIG. 1, in which processor block 110 may be located.

Microprocessor 200 in this exemplary embodiment includes an instruction processor local bus ("IPLB") 202, a data read PLB ("DRPLB") 203, and a data write PLB ("DWPLB") 204. In this exemplary embodiment, microprocessor 200 may be a PowerPC, or more particularly a 440 PowerPC, available from IBM. However, from the following description, it should be appreciated that other types of microprocessors with other types of interfaces may be used. Moreover, from the following description, it should be appreciated that an ASIC core other than a microprocessor ASIC core may be used.

Components of processor block 110 are generally hardwired such that their performance exceeds that of programmable logic of FPGA fabric 290, to which processor block 110 is coupled. Processor block 110 includes registers, such as internal registers 270, which may be set in order to condition processor block 110 for any of a variety of user selectable configurations, as described below in additional detail.

A device control register block ("DCR") 205 may be coupled to microprocessor core 200 and may be part of processor block 110. DCR 205 may be used to provide settings to registers controlled by microprocessor core 200 or other registers subject to control by DCR block 205. DCR block 205 may be used to set registers of internal registers 270.

Arrows in FIG. 2 indicate the direction of a transaction. Thus, for example, register input provided to DCR 205 may be from a transaction initiated by microprocessor 200 or from another master device instantiated for example in whole or in part in FPGA fabric 290. Such transaction may pass through DCR 205 to internal registers 270. One or more master devices (not illustratively shown in FIG. 2), other than microprocessor 200, may be instantiated in FPGA fabric 290, may be other ASIC cores of FPGA 100, or may be external ICs coupled to FPGA 100, or any combination thereof. Such master devices external to processor block 110 may be coupled thereto via a direct memory access ("DMA") interface block, such as DMA interface blocks ("DMA interfaces") 216 through 219, or a slave PLB interface block ("SPLB interface"), such as SPLB interfaces 214 and 215. Thus, with respect to transaction origination, DMA interfaces 216 through 219 and SPLB interfaces 214 and 215 may generally be thought of as FPGA fabric 290-to-crossbar 299 bridges, and memory controller interface block ("memory controller interface") 212 and master PLB interface block ("MPLB interface") 213 may generally be thought of as crossbar 299-to-FPGA fabric 290 bridges. DMA interfaces 216 and 219 may be coupled to FPGA fabric by local links 220-1 through 220-4, respectively, as described in additional detail below with respect to FIG. 3. DMA interfaces 216 through 219, SPLB interfaces 214 and 215, memory controller interface 212 and MPLB interface 213 are collectively referred to herein as "interfaces 298."

Transactions may be initiated by microprocessor 200 as indicated by arrows respectively from IPLB 202, DRPLB 203, and DWPLB 204. However, it should be understood that a transaction issued by microprocessor 200 may result in data being provided to microprocessor 200 responsive to such an issued transaction.

A crossbar 299 is part of processor block 110. Crossbar 299 includes address decoder blocks ("decoders") 222 through 226, arbitration block ("arbiter") 221, crossbar switch ("switch") 211, and arbitration blocks ("arbiters") 227 and 228. IPLB 202, DRPLB 203, and DWPLB 204 are respectively coupled to decoders 223 through 225. Decoders 222 through 226 are respectively coupled to arbiter 221. Arbiter 221 is coupled to switch 211. Decoders 222 through 226 decode addresses associated with transactions, and transactions with decoded addresses are provided to arbiter 221 for arbitrating access to switch 211. The decoded addresses for transactions having been granted access to switch 211 are used to route such transactions to memory controller interface 212 or MPLB interface 213.

Memory controller interface 212 and MPLB interface 213 are both part of processor block 110. SPLB interfaces 214 and 215 are part of processor block 110, and DMA interfaces 216 through 219 may optionally be part of processor block 110.

Crossbar switch 211 is coupled to memory controller interface 212 and MPLB interface 213. Memory controller interface 212 may be coupled to FPGA fabric 290. Likewise, MPLB interface 213 may be coupled to FPGA fabric 290. Thus, for example, microprocessor 200 may issue an instruction transaction, a read transaction, or a write transaction which is respectively decoded by decoder 223, 224, or 225 to provide target addresses, which may be for either or both memory controller interface 212 or MPLB interface 213. A decoded address is used by switch 211 once access to switch 211 for such decoded address is granted by arbiter 221. Thus, switch 211 responsive to a decoded address provides such address for example to memory controller interface 212 to access a memory controller device coupled thereto or to MPLB interface 213 to access a peripheral device coupled thereto.

Memory controller interface 212 includes an inbound first-in, first-out buffer ("FIFO") 250 and an outbound FIFO 251. MPLB interface 213 includes an inbound FIFO 260 and an outbound FIFO 261. Each SPLB interface 214 and 215 includes a respective inbound FIFO 240 and an outbound FIFO 241. Lastly, each DMA interface 216 through 219 includes a respective inbound FIFO 230 and outbound FIFO 231. Thus, even though the direction of a transaction is directed to memory controller interface 212 or MPLB interface 213 such as originating from microprocessor 200 or FPGA fabric 290, it should be appreciated that data or other information flow associated with such a transaction may be in either or both input and output directions. Thus, crossbar 299 is bidirectional, as described below in additional detail.

For purposes of clarity by way of example and not limitation, some numerical examples of bit widths are provided. However, it should be understood that these or other bit widths may be used as may vary from application to application.

If a user decides to burst 1, 4, 8, or 16 quad words at a time, where a word is 32 bits, memory controller interface 212 may be configured to output such quad word bursts. Within processor block 110, the data width of memory controller interface 212 is 128 bits; however, for communication with FPGA fabric 290, memory controller interface 212 interface to FPGA fabric 290 or otherwise external coupling with respect to processor block 110 is user selectable, such as for a 32-, 64-, or 128-bit wide interface. Variable bus sizing of memory controller interface 212 to FPGA fabric 290 is facilitated in part by a bus formed using PIPs of FPGA fabric 290. As shall be appreciated from the following description, any combination of 32-, 64-, and 128-bit soft buses associated with memory controller interface 212 and MPLB interface 213 may communicate with any 32-, 64-, and 128-bit soft buses associated with SPLB interfaces 214 and 215. Furthermore, memory controller interface 212 supports various clocking ratios with respect to frequency of microprocessor 200; examples of such microprocessor-to-memory controller interface clocking ratios may include 1:1, 4:3, 3:2, and 2:1.

Effectively, by providing FIFOs 250 and 251, memory controller interface 212 is a FIFO-like port which is clocked at the operating rate of microprocessor 200. There may be as little as a one clock cycle latency, subject to port availability, for sending a decoded address and transaction across crossbar 299 to memory controller interface 212. Likewise, this one clock cycle latency capability across crossbar 299 is applicable to all accesses to crossbar 299, subject to port availability, and is a latency of one clock cycle of a rated speed of operation of microprocessor 200.

PLBs of microprocessor 200 are optionally extended to FPGA fabric via ASIC circuitry provided as one or more of SPLB interfaces 214 and 215 and a MPLB interface 213. However, this is not a mere extension of PLBs of microprocessor 200 because the ASIC circuitry is not merely an extension of wires, but performs additional functions.

MPLB interface 213 operates at a fraction of the rated speed of microprocessor 200, namely approximately one half to one quarter of such rated speed of microprocessor block 200. MPLB interface 213 therefore may load data into outbound FIFO 261 or unload data out of inbound FIFO 260 at the rated speed of microprocessor 200, but data loaded into inbound FIFO 260 and data unloaded from outbound FIFO 261 is at the rated speed of MPLB interface 213. For purposes of clarity by way of example and not limitation, it shall be assumed that the rated speed of operation of microprocessor 200 is approximately 400 to 550 MHz, and the speed of operation of MPLB interface 213 is approximately 133.3 to 183.3 MHz. The clock ratio of the frequency of microprocessor 200 frequency to that of MPLB interface 213 is generally an integer ratio. Frequency of MPLB interface 213, as well as SPLB interface 214 and SPLB interface 215, may have an integer dependency with respect to frequency of crossbar 299. Examples of such frequency dependency crossbar-to-PLB interface may be 1:1, 1:2, 1:3, etc. Crossbar 299 may operate at 1/N (integer) or 2/N ratio with respect to frequency of microprocessor 200, for N a positive integer greater than zero. Therefore, frequency of operation of MPLB interface 213, as well as of SPLB interfaces 214 and 215, may have a non-integer clock ratio with respect to frequency of operation of microprocessor 200.

Accordingly, it should be appreciated that FIFOs, such as FIFOs 250, 251, 260, and 261, as well as command queues (described below in additional detail) of crossbar 299, generally represent respective pipeline channels for bridging transactions, such as from microprocessor 200 to FPGA fabric 290. PLB reading from and writing to microprocessor 200 may be via respective unidirectional channels; however, unidirectional channels associated with PLBs of microprocessor 200 have been combined into bidirectional channels in MPLB interface 213. Thus, MPLB interface 213 is a bidirectional interface using FIFOs 260 and 261 and multiplexer circuitry (not shown for purposes of clarity). Thus, for example, an instruction fetch may be issued via IPLB 202 to memory controller interface 212 via crossbar 299 to read an instruction from memory coupled thereto via a memory controller instantiated in FPGA fabric 290, and at the same time microprocessor 200 may issue a data write via DWPLB 204 to MPLB interface 213 via crossbar 299 to write data to a peripheral device coupled thereto. This may be done concurrently through crossbar 299, as switch 211 has separate sets of connections (not shown for purposes of clarity), namely one set of connections for memory controller interface 212 and one set of connections for MPLB interface 213, such that transactions for memory controller interface 212 and MPLB 213 do not block one another. Moreover, each of these sets of connections is for a 128-bit width, and communication with and within crossbar 299 is configured for a bus width of 128 bits.

Order of transactions is preserved via pipelines and buffers, including one or more command buffers. For example, a command buffer (not shown for purposes of clarity) may be for multiple transactions targeted to memory controller interface 212. Likewise, order of transactions is preserved via pipelines and buffers, including another command buffer (not shown for purposes of clarity) for multiple transactions targeted to MPLB interface 213 for example. The side of MPLB interface 213 associated with FPGA fabric 290 is not a FIFO-based protocol, but rather is an address/data transaction protocol with a data phase and an address phase.

In addition to memory controller interface 212, which is configurable for a user-specified memory protocol, and MPLB interface 213, which uses a PLB protocol with bidirectional read and write busing, there are additional blocks that increase the interface bandwidth of processor block 110. These additional blocks may include one or more of SPLB interfaces 214 and 215. Again, each of SPLB interfaces 214 and 215 includes an inbound FIFO 240 and an outbound FIFO 241.

In this exemplary embodiment, DMA interfaces 216 and 217 and SPLB interface 214 are grouped together for access to decoder 222 via arbiter 227. Likewise, DMA interfaces 218 and 219 and SPLB interface 215 are grouped together for access to decoder 226 via arbiter 228. It should be appreciated that DMA protocols and PLB protocols may be used for coupling to any of a variety of peripheral devices. In this exemplary embodiment, DMA interfaces 216 through 219 are coupled to local links 220-1 through 220-4, respectively.

In the exemplary embodiment, clock rate of SPLB interfaces 214 and 215 is user settable to an integer ratio with respect to the frequencies of operation of microprocessor 200 and crossbar 299. The respective sides of FIFOs 240, 241, 250, 251, 260, and 261 associated with FPGA fabric 290 generally have a synchronous relationship with respect to crossbar 299. For purposes of clarity by way of example and not limitation, it shall be assumed that the speed of operation of SPLB interfaces 214 and 215 is approximately 133.3 to 183.3 MHz.

In the exemplary embodiment of processor block 110, crossbar 299 is a five-to-two crossbar. In other words, there are five ports, respectively associated with decoders 222 through 226, for coupling to two blocks, namely memory controller interface 212 and MPLB interface 213. Alternatively, a nine-to-two crossbar or some other crossbar configuration may be used; however, for reasons of anticipated utilization and relative clock rates, a five-to-two crossbar 299 is illustratively shown.

FIFOs of processor block 110, in addition to facilitating adaptation to differences in bandwidth, facilitate processing transactions concurrently by pipelining such transactions. As described below in additional detail, switch 211 is a non-blocking crossbar switch, and once access is granted to switch 211, execution happens immediately. Furthermore, because memory controller interface 212 is capable of operating at the rated frequency of microprocessor 200, having communication to processor block 110 via one or more of SPLB interfaces 214 and 215 is facilitated by enhancing performance of memory controller interface 212 in comparison with that of SPLB interfaces 214 and 215. In short, memory controller interface 212 operates at a higher frequency than SPLB interfaces 214 and 215. Moreover, performance level of memory controller interface 212 is substantially greater than circuits instantiated in CLBs or other programmable logic of FPGA fabric 290.

A master device, for example instantiated in FPGA fabric 290 or another ASIC core of FPGA 100, may be coupled to processor block 110 via an SPLB interface of SPLB interfaces 214 or 215. Memory controller interface 212 may be thought of as having only one slave device coupled to it, namely memory coupled to it via a memory controller. Furthermore, such a memory controller for interfacing to memory may be substantially simplified as the physical ("PHY") layer of such memory controller may be directly interfaced with memory controller interface 212. MPLB interface block 213, however, is not limited to a single slave device, but may have multiple slave devices coupled to it. This is part of the reason for the slower frequency of operation of MPLB interface 213 in comparison to memory controller interface 212.

Other master devices, such as other ASIC cores, other processors whether instantiated in FPGA fabric 290 or as ASIC cores, or other circuits whether ASIC cores or instantiated in FPGA fabric 290, may be coupled to processor block 110 via any of SPLB interfaces 214 or 215. It is not necessary that all transactions proceed to memory via memory controller interface 212. Thus, a master device may be coupled for example to SPLB interface 214 for executing a transaction utilizing a slave device, which may be a memory controller or a peripheral device, coupled to MPLB interface 213. Moreover, a master device coupled to SPLB interface 215 may issue a transaction to a slave device coupled to MPLB interface 213. It should, however, be understood that excluding transactions initiated by microprocessor 200, transactions from master devices coupled to any of SPLB interfaces 214 and 215 go into crossbar 299 and then to either memory controller interface 212 or MPLB interface 213 to a memory controller or to one or more other slave devices, respectively, coupled thereto. In short, transactions go into and out of crossbar 299 and interfaces 298 of processor block 110, and thus crossbar 299 and interfaces 298 in combination may be thought of as a bridge or bridges.

SPLB interfaces 214 and 215 in combination with MPLB interface 213 support address pipelining. Thus, if a transaction is stalled, other transactions may be stacked up behind it in an output command queue of crossbar 299. There are two output command queues of crossbar 299, namely one for reads and one for writes to allow concurrent read and write transactions as described below in additional detail. Commands waiting in output command queues have completed an address decode phase, and may be waiting on a data phase to begin. At the completion of a data phase for a current command being processed, a next command in a command queue has its data phase initiated, and successive data phases may be initiated without any "dead" cycle between them. It should be understood that outbound FIFOs 251 and 261 facilitate pipelining for adaptation to availability and relative transaction speed of slave devices coupled to memory controller interface 212 and MPLB interface 213, respectively.

There may be local buses inside FPGA 100 that are dedicated. For example, if a slave device is not shared, but rather is receptive to only one master device, then a dedicated local bus may be used. While processor block 110 may be used for such a bridging operation, a local bus may be used instead. However, slave devices may operate with 32-, 64-, or 128-bit transactions as MPLB interface 213 is not only adaptable to different bus sizes, but is also adaptable to different transaction sizes. Thus, for example, a 32-bit transaction may be performed via a 128-bit soft bus in FPGA fabric 290 coupled to MPLB interface 213. Again, processor block 110 internal busing crossbar 299, for example is 128 bits. So, for example, a burst of eight 64-bit transfers is a burst of four 128-bit transfers in crossbar 299. Thus, 32- and 64-bit transactions from soft masters for example are converted to a 128-bit format for processing through crossbar 299. This conversion may include command modification, data mirroring, and steering. Additionally, the conversion may optionally include packing for burst transfers and line transfers to enhance bandwidth efficiency of crossbar 299, namely to enhance usage of the full width of 128-bit internal crossbar 299 buses. Single transfers thus may not be packed.

Transfers may be misaligned. A packet may not be aligned to a quad word. So to align transfers, a single word transaction for a larger transfer is performed first, followed by one or more quad word aligned transactions depending on the size of the transfer. These transactions may for example be 8 quad word aligned transactions. If the quad word aligned transactions are too large to end the transfer, a single word transaction or transactions may be used to complete the transfer.

Microprocessor 200 is a master device as it issues transactions for other devices. Furthermore, it should be appreciated that any transactions which originate via a master device coupled to any of SPLB interfaces 214 and 215, or via microprocessor 200, exit processor block 110.

SPLB interfaces 214 and 215, like MPLB interface 213, are 128 bits wide and may be set to operate as 64-bit wide interfaces. However, SPLB interfaces are configured to dynamically adapt to traffic from a 32-bit master device. Moreover, MPLB interface 213 and SPLB interfaces 214 and 215 are dynamic interfaces, as their bus width on a side associated with FPGA fabric 290 may be varied for coupling to a soft bus configured using PIPs of FPGA fabric 290.

FPGA fabric 290 generally operates much more slowly for example than crossbar 299. Thus, a five-to-two crossbar, rather than a nine-to-two crossbar, may be implemented. Part of this implementation involves having interface blocks, such as SPLB interfaces 214 and 215, accumulate a threshold amount of data before being granted access to switch 211.

SPLB interfaces 214 and 215 are "slave" interfaces. SPLB interfaces 214 and 215 have coupled to them a master device, which is external to processor block 110, such as may be instantiated in FPGA fabric 290. However, memory controller interface 212 and MPLB interface 213 are "slave" interfaces with respect to microprocessor 200, and SPLB interfaces 214 and 215, as memory controller interface 212 and MPLB interface 213 each service microprocessor 200, and one or more master devices coupled via SPLB interfaces 214 and 215. Memory controller interface 212 and MPLB interface 213 are master interfaces with respect to "slave" devices coupled thereto via buses external to processor block 110.

Arbiters 227 and 228 may be implemented as round robin arbiters. Thus, for example, arbiter 227 may select any of DMA interface 216, DMA interface 217, or SPLB interface 214 in a round robin format. However, for SPLB interfaces 214 and 215 to have a right to request access to switch 211, SPLB interfaces 214 and 215 have stored therein a set threshold amount of data ready to be exchanged across switch 211. The threshold level of data may be set by a user.

It should be appreciated that FIFOs 230, 231, 240, 241, 250, 251, 260, and 261 each have a bit width corresponding to the bit width of memory controller interface 212 and MPLB interface 213, namely 128 bits wide for example. In other words, a user may write, or read, multiple quad words onto, or from, a line of any of FIFOs 240, 241, 250, 251, 260, and 261. FIFOs 240, 241, 250, 251, 260, and 261 may be implemented with latches or flip-flops, or a combination thereof. Again, the user may set the threshold amount of data for SPLB interfaces 214 and 215 to request access to switch 211. The minimum a user may set may be one quad word. However, once access is obtained, even if there is a partial quad word to process as part of such data meeting or exceeding a threshold amount, such partial quad word is processed along with the data for which access is granted.

Inbound FIFOs 240, 250, and 260 allow data to be accumulated. Once enough data is accumulated in an interface without overflowing an associated FIFO, then a request for access to crossbar 299 may be initiated by such associated interface. The threshold amount of data to be accumulated by each of SPLBs 214 and 215 may be individually set by register settings. Thus each of SPLBs 214 and 215 may have same, different, or a combination of one or more threshold settings. Such threshold settings include 1, 4, 8, or 16 quad words. Each cache word may be two quad words wide. To reduce request overhead to access switch 211, arbiters 227 and 228 preclude requests until a threshold amount of data has been accumulated in an inbound FIFO. This preclusion of requests may be thought of as a load-balancing, multiplexing protocol. Data flow out of outbound FIFOs 241, 251, and 261 may be dependent upon master devices external to processor block 110, such as may be instantiated in FPGA fabric 290.

As described below in additional detail, register address mapping is configurable for processor block 110, namely for accessing either memory controller interface 212 or MPLB interface 213. Addresses are input to decoders 222 through 226. More particularly, after arbitration via arbiter 227 or 228, an address associated with a transaction to be provided to either memory controller interface 212 or MPLB interface 213 is decoded by decoder 222 or 226, respectively. It should be appreciated that address decoding may be performed before arbitration by arbiter 221, namely address decoding is performed by decoders 222 through 226 before crossbar arbitration by arbiter 221. Additionally, as part of the decoding to select between memory controller interface 212 or MPLB interface 213, there may be additional decoding of an address within the selected interface, namely an address for a slave device coupled to memory controller interface 212 or MPLB interface 213. A decoded address may be provided to arbiter 221 for providing access to switch 211. Arbiter 221 may be configured by user selection for any of a variety of arbitration protocols responsive to register input. Examples of such arbitration protocols include round robin, fixed, and least recently used; however, other arbitration protocols may be used. Arbitration by arbiter 221 and decoding by decoders 222 through 226 may be performed with some degree of parallelism to facilitate a one clock cycle latency as previously described.

Crossbar 299 provides a non-blocking interconnection. By "non-blocking", it is meant that two different master devices may access two different slave devices simultaneously. For example, a master device in FPGA fabric via one of interfaces 214 and 215 may access memory controller interface 212 simultaneously while microprocessor 200 accesses MPLB interface 213. However, multiple master devices may have multiple transactions that are pipelined to a single interface, such as either or both of interfaces 212 and 213.

Memory mapping may be done with a configuration bitstream to set register values. These register values may be set in internal registers 270. Alternatively, rather than or in addition to setting register values using a configuration bitstream, DCR operations may be used to set register values. However, memory mapping for some user designs may not change, and thus setting register values by configuration bitstream may be sufficient in some applications. Each of memory controller interface 212 and MPLB interface 213 may thus be address programmable.

Moreover, this memory mapping is flexible. It should be understood that because address spaces for a user design to be instantiated into FPGA fabric 290 may vary from user to user, such address spaces are not fixed. Rather, a user may program the memory map for processor block 110 via a configuration bitstream, or alternatively via DCR 205. However, programmed memory address spaces may be changed via DCR 205 after programming via a configuration bitstream. An example of memory mapping may include setting an address in a memory map of memory controller interface 212 for booting microprocessor 200 from flash memory located at such address and coupled to memory controller interface 212. Another example of memory mapping may be setting a portion of the memory address range that may be mapped to MPLB interface 213 for accessing peripherals.

Supported transfer types may include single word, cache line, fixed length burst, and variable length ("indeterminate") burst (e.g., end location of bursting transfer not presently known). It should be appreciated that there is a distinction between burst and line data transfers. Line transfers have an architectural identity in that they start at the beginning of a line and go to the end of the line. Thus, for a cache line transfer, access starts from the beginning of the line and goes to the end of the line, whether or not a wraparound condition follows. In contrast, burst transfers may start at the beginning of any word on a line at an identified address and continue until an end word is reached. Thus, a burst transfer may, but need not, start at the beginning of a line. Because of the architectural identity of line transfers, line transfers are not translated. However, burst transfers may be translated. Thus, for example, long bursts may be translated to fixed, short-length bursts by multiplexing circuitry (not shown) of crossbar 299.

Default values for configuration of internal registers 270 of processor block 110 may be programmed into configuration memory cells 291 coupled to internal registers 270. Such default values may be programmed into memory cells 291 via a configuration bitstream. Thus, immediately upon a reset of processor block 110, default values may be loaded from memory cells 291 into configuration registers 270.

Figure 3:
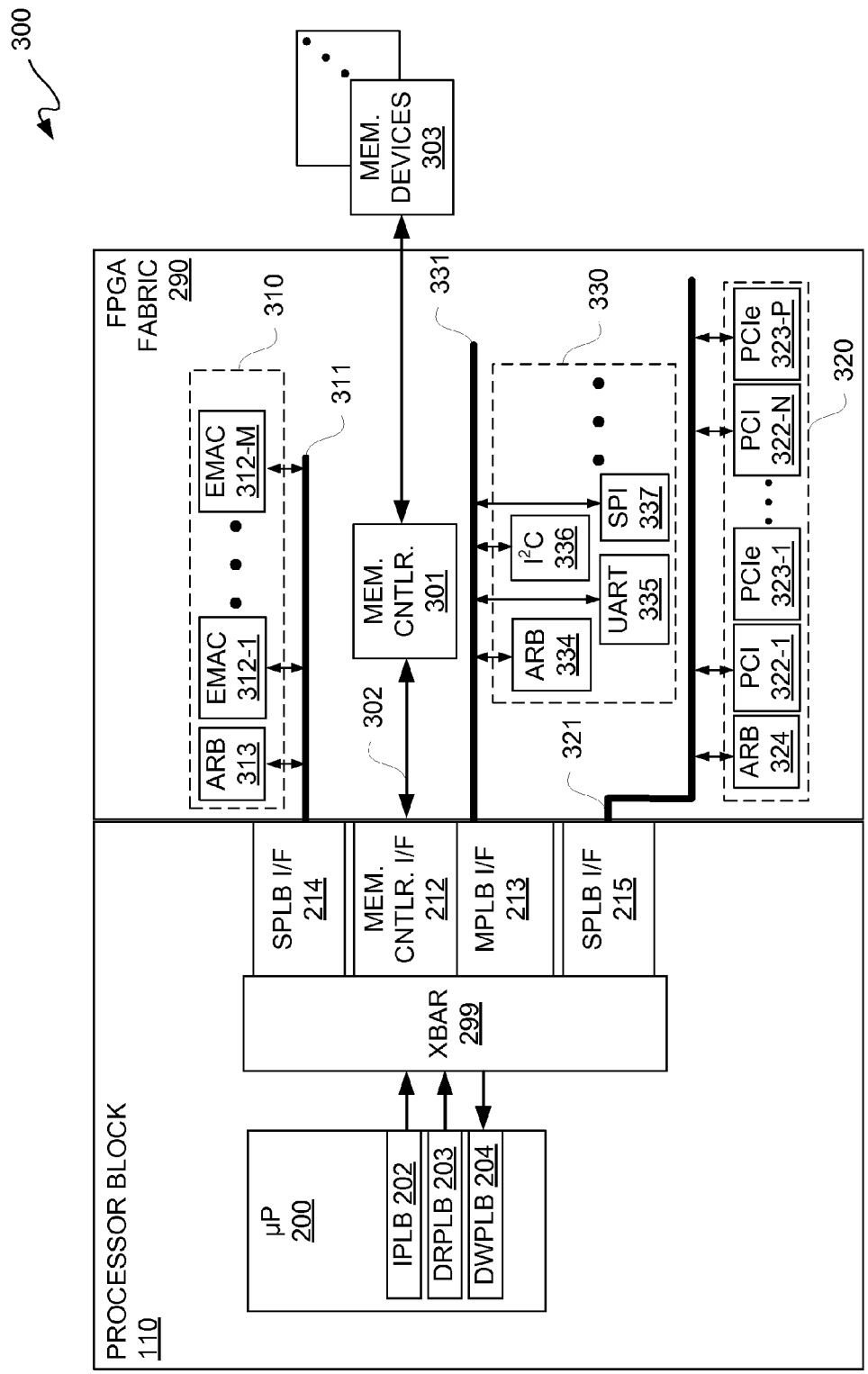
FIG. 3 is a block diagram depicting an exemplary embodiment of a system in which the processor block of FIG. 2 may be used.

FIG. 3 is a block diagram depicting an exemplary embodiment of a system 300 in which processor block 110 may be used. Processor block 110 may be coupled to a memory controller 301 instantiated in FPGA fabric 290. Accordingly, memory controller 301, or at least the portion of that circuit instantiated in programmable logic of FPGA fabric 290, may be thought of as a "soft" memory controller. Memory controller 301 may be coupled to memory controller interface 212 of processor block 110 via soft memory control interface bus 302. Buses 311, 321, and 331 may all be soft buses instantiated using PIPs of FPGA fabric 290. Memory controller 301 may be coupled to one or more memory devices 303, where such one or more memory devices 303 are either internal or external to FPGA 100.

As previously described, master devices may be instantiated in FPGA fabric 290. For example, one or more soft master devices 310 may be coupled to a soft SPLB 311 which is coupled to SPLB interface 214 of processor block 110. Soft SPLB 311 may have coupled to it one or more Ethernet media access controllers ("EMACs") 312-1 through 312-M, for M a positive integer greater than zero. There may be arbitration associated with access to SPLB 311 as indicated by arbitration block 313. EMACs 312-1 through 312-M are master devices, which in this exemplary embodiment are implemented in FPGA fabric 290 as soft master devices. However, it should be understood that one or more hard EMAC master devices may be coupled to SPLB interface 214 via SPLB 311.

Moreover, one or more other soft, or hard, master devices 320 may be coupled to soft SPLB 321 which is coupled to SPLB interface 215. In this example, soft master devices of FPGA fabric 290 are PCI blocks 322-1 through 322-N, and PCI Express blocks 323-1 through 323-P, for N and P positive integers greater than zero. PCI blocks 322-1 through 322-N, and PCI Express blocks 323-1 through 323-P may be coupled to SPLB interface 215 via soft SPLB bus 321. An arbitration block as generally indicated by arbitration block 324 may be used to arbitrate access of PCI blocks 322-1 through 322-N and PCI Express blocks 323-1 through 323-P to SPLB 321.

As previously indicated, MPLB interface 213 is a slave device with respect to switch 211. However, MPLB interface 213 is master device with respect to slave devices coupled to soft MPLB 331. More particularly, one or more hard or soft slave devices may be coupled to soft MPLB 331. In this exemplary embodiment, soft slave devices 330 which are coupled to MPLB 331 are instantiated in FPGA fabric 290. Access to MPLB 331 may be arbitrated by an arbitration block 334. Examples of soft slave devices may include one or more instances of a UART 335, an I²C block 336, an SPI block 337, slave interfaces of master/slave devices (e.g., EMAC, or PCI), or one or more other peripheral devices.

In the exemplary embodiment previously described with respect to FIG. 2, crossbar 299 provides command pipelining in command FIFOs for up to five transactions (in each direction) to each of memory controller interface 212 and MPLB interface 213 corresponding to the five master transaction inputs to decoders 222 through 226 of FIG. 2. However, as previously indicated, other command queue depths may be used.

Figure 4:
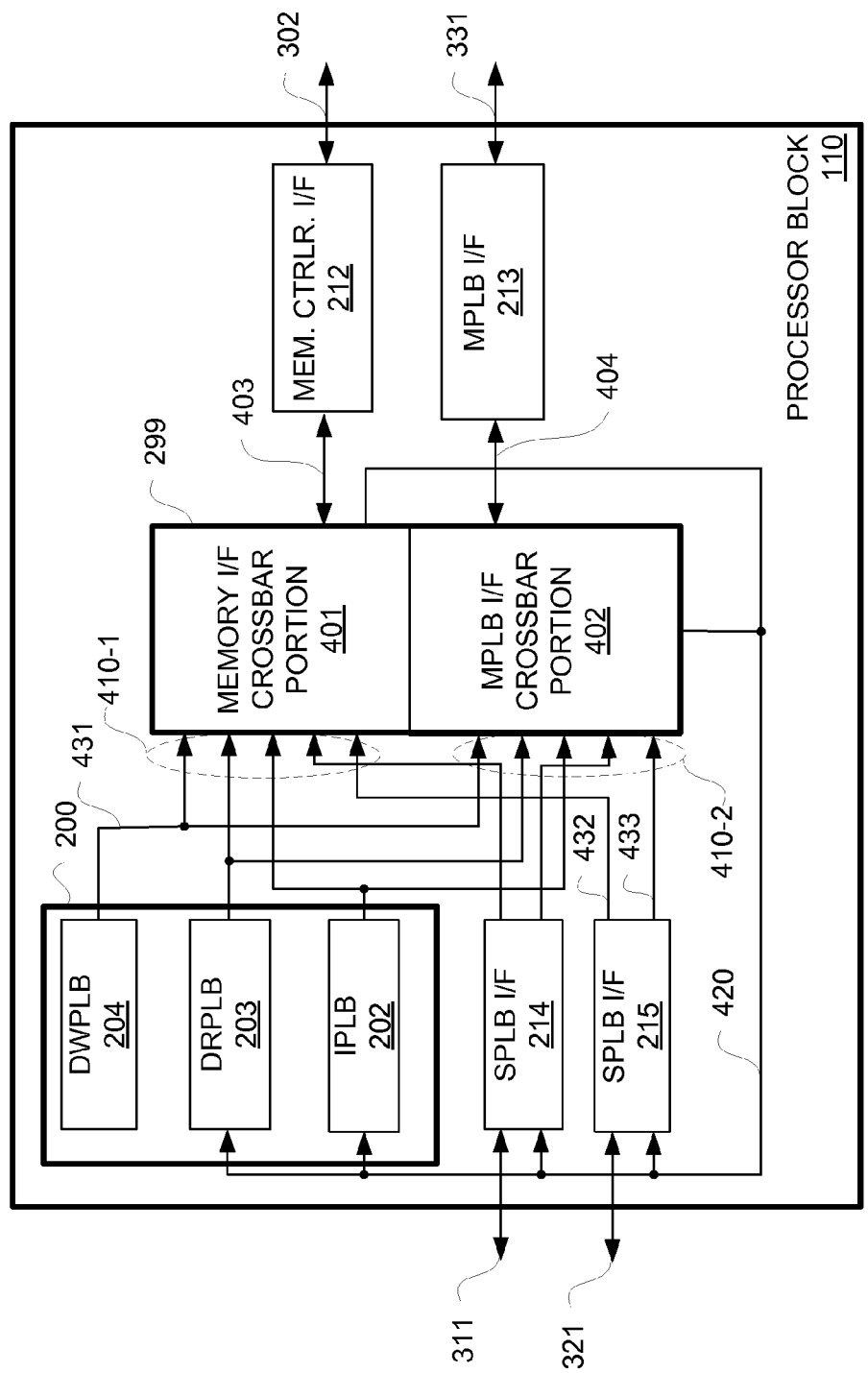
FIG. 4 is a block diagram depicting an exemplary embodiment of an interconnection for the processor block of FIG. 2.

FIG. 4 is a block diagram depicting an exemplary embodiment of an interconnection for processor block 110 of FIG. 2. The processor interconnection is described with simultaneous reference to FIGS. 2 and 3.

DWPLB 204, DRPLB 203, and IPLB 202 of microprocessor 200 are each coupled to memory interface crossbar portion 401 and MPLB crossbar portion 402 of crossbar 299 to provide thereto write data, address, control, and arbitration information from microprocessor 200. Additionally, SPLB interfaces 214 and 215 are each coupled to memory interface crossbar portion 401 and MPLB crossbar portion 402 to provide thereto write data, address, control, and arbitration information from one or more master devices coupled to such interfaces 214 and 215 respectively via SPLB 311 and SPLB 321.

Portions 401 and 402 have separate arbitration logic, separate read and write command queues, and common crossbar logic, all of which are described below in additional detail. So, for example, switch 211 is two switches, one for memory interface PLB 403 and one for general purpose PLB 404. For each of such switches, a respective arbitration block, a read command queue, and a write command queue are hardwired. Although decoders 222 through 226 are not illustratively shown in FIG. 4, it should be understood that address information has been decoded for directing a command to the appropriate location.

Each portion 401 and 402 receives write data, address, control, and arbitration information, generally indicated as master device information input 410-1 and 410-2, collectively and singly information input 410. It should be appreciated that such information input 410 is from an initiated transaction by a master device, such as microprocessor 200 or a master device coupled to an interface of SPLB interfaces 214 and 215. Such an initiated transaction may be addressed for memory controller interface 212 or MPLB interface 213. DMA interfaces 216 through 219 are not illustratively shown for purposes of clarity and not limitation, as their interconnection shall be understood from the description herein of interconnecting SPLB interfaces 214 and 215.

The same signals sent from DWPLB 204 may be provided to both memory interface crossbar portion 401 and MPLB crossbar portion 402 via a common bus 431. Likewise, respective common buses provide signals from DRPLB 203 and IPLB 202 to both memory interface crossbar portion 401 and MPLB crossbar portion 402. Master interfaces, such as PLB interfaces 202 through 204, are bidirectional to portions 401 and 402 via a common bus for each interface. Additionally, bidirectional buses 432 and 433 may couple SPLB interface 215 to memory interface crossbar portion 401 and MPLB crossbar portion 402. Moreover, a common bidirectional bus may couple SPLB interfaces 214 and 215 to memory interface crossbar portion 401 and MPLB crossbar portion 402.

Provided from portions 401 and 402 to SPLB interfaces 214 and 215 and to DRPLB 203 and IPLB 202 is read data, control, and address acknowledgement information. This output information 420 is from portions 401 and 402 in response to an initiated transaction or command. Thus, even though bused on a common bus, such output information 420 is directed for the initiator block by crossbar logic common to portions 401 and 402. Some of this output information 420 is internal handshaking with an initiator block, and some of this output information 420 may be the result of a completed transaction, such as data obtained via MPLB 331 or memory controller interface bus 302. Thus, for example, a completed read transaction of memory coupled to memory controller interface bus 302 provides read data through memory controller interface 212 to memory interface PLB 403 for memory I/F crossbar portion 401 for a transaction initiator block, such as a master device coupled to an interface of SPLB interfaces 214 or 215, or microprocessor 200. Thus, in the response to an initiated transaction by a transaction initiator block, each of SPLB interfaces 214 and 215 and DRPLB 203, DWPLB 204, and IPLB 202 does not receive the same set of output information 420, as such output information 420 may only be provided to the interface associated with the transaction initiator block initiating the transaction resulting in such output information 420.

Figure 5:
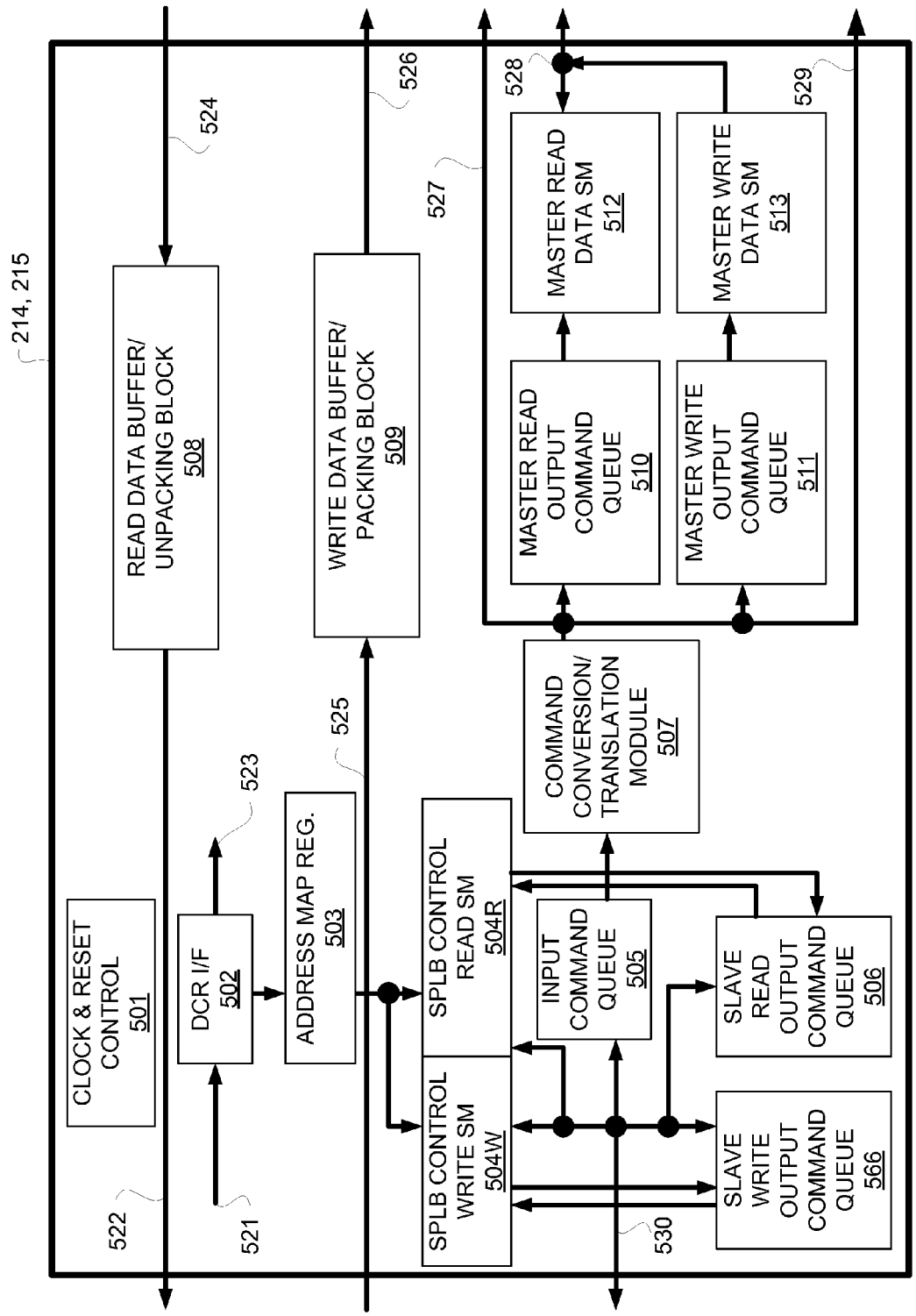
FIG. 5 is a block diagram depicting an exemplary embodiment of a slave processor local bus interface block ("SPLB interface") of the processor block of FIGS. 2 through 4.

FIG. 5 is a block diagram depicting an exemplary embodiment of a crossbar structure 500, which may be used for crossbar 299 of FIGS. 2 through 4. A two stage decoding process, namely decoding to select between memory controller interface 212 and MPLB interface 213 and decoding for an address of an address map, provides flexibility to a user while simultaneously reducing the number of bits involved to decode a requested address. Crossbar 299 implements address mapping for processor PLB interfaces. For a request originating from SPLB interfaces 214 and 215, SPLB interfaces 214 and 215 pre-decode the request. These SPLB interfaces 214 and 215 provide this information to crossbar 299 via a control signal. Thus, crossbar 299 does not have to decode the address again for inbound communication from for example FPGA fabric 290 in response to an initiated transaction, which improves timing since the address mapping falls on time-sensitive paths. For purposes of clarity and not limitation, it shall be assumed that input information 410 includes previously decoded addresses.

A PLB protocol defines two phases of a transaction, namely an address phase and a data phase, which occur independently on separate buses. When a request is acknowledged by a slave device, namely via an interface 212 or 213, the slave device has committed to provide the data during the data phase of the transaction. A delay may occur before the data phase is started by the slave device. Multiple data phases may additionally be pipelined by slave devices in a system.

To keep track of data phases which are outstanding, crossbar 299 maintains two command queues for each arbiter, namely one for reads and the other for writes (not shown for purposes of clarity). Crossbar 299 uses the information stored in the command queues to direct the slave device data phase responses to the appropriate master device and to determine if crossbar 299's particular transaction has been completed.

After a transaction is completed for example on an FPGA fabric 290 side of such transaction, the result of such transaction is provided back to crossbar 299, which may include one or more of an address phase, a read phase, and a data phase via an interface from which the transaction was provided to FPGA fabric 290.

When a master device, whether microprocessor 200 or a master device instantiated in FPGA fabric 290 for example, coupled to crossbar 299 requests a transaction to be performed, the identity of the requesting master device is temporarily stored with any other stored identities, in command queues 504, 505, 514, and 515 depending on the transaction. The stored identity of a requesting master device may be used to steer returned data or control information, resulting from execution of such a transaction, to the requesting master device. The master device identity may be used to generate mask bits that control this steering.

Read and write command queues facilitate the pipelining of read and write data phases. For purposes of clarity by way of example and not limitation as previously described, read and write command queues may each be five deep and hence up to five read and four write data phases may be outstanding for any slave bus, namely buses 403 and 404. Of course even though the example depth of such command queues is five, other depths less than or greater than five may be used. Byte enable ("BE") and size transfer qualifiers are pushed into a crossbar command FIFO, namely a read or write command queue as described above. Once a data phase of a transaction has been completed, the command FIFO is popped and used to redirect the transaction response signals from the slave device to the correct master device.

MPLB interface 213 and SPLB interfaces 214 and 215 adapt the transaction rate of crossbar 299 to transaction rates of slave devices and master devices instantiated in FPGA fabric 290. Generally, crossbar 299 operates at a higher clock frequency rate than that of master and slave devices instantiated in FPGA fabric 290, namely soft master and slave devices. However, other causes for a mismatch in transaction rate between one or more soft master devices or one or more soft slave devices and transaction rate of crossbar 299 may be present. Because crossbar 299 runs at a higher clock frequency than such soft master and slave devices, this results in a higher throughput for crossbar 299. Arbiter 221 apportions available crossbar bandwidth among various active PLB master device ports namely, IPLB 202, DWPLB 203, and DWPLB 204 directly connected to crossbar 299. SPLB interfaces 214 and 215 which send and received data to and from MPLB interface 213 only receive a fraction of the bandwidth of crossbar 299 when microprocessor 200 is accessing MPLB interface 213. Moreover, this bandwidth is further divided if both of SPLB interfaces 214 and 215 are accessing MPLB interface 213 contemporaneously within some window of time such that they are competing for such access.

In addition to the difference in frequency of operation of crossbar 299 with respect to soft master and slave devices, and arbitration dividing up available crossbar bandwidth among various active PLB master devices, there is another possible cause for a difference in transaction rate between crossbar 299 and one or more soft master or slave devices. In an embodiment, MPLB interface 213 and SPLB interfaces 214 and 215, as well as crossbar 299, internally have 128-bit wide FIFOs for data throughput. Thus, SPLB interfaces 214 and 215, crossbar 299, and MPLB interface 213 in combination natively support a 128-bit bridge for bridging a soft master device to a soft slave device, for example. However, SPLB interfaces 214 and 215, as well as MPLB interface 213, also support data bit widths less than 128 bits, more generally less than their native bridging bit width support. For example, interfaces 213 through 215 may support 32-bit and 64-bit PLB soft master or slave devices though at the expense of a reduced throughput, which may cause or further a difference between crossbar transaction rate to transaction rate of a soft master or soft slave device.

Accordingly, it should be appreciated that any of the above-described factors, and a combination of any of these factors, may dynamically result in a mismatch between transaction rate of the bridging function of processor block 110 as between soft master and slave devices. To avoid possible data loss, rate adaptation is provided using flow control mechanisms built into a PLB protocol together with the use of FIFOs for command and data buffering to absorb temporary differences in transactions rates.

SPLB interfaces 214 and 215, as well as MPLB interface 213, are collectively referred to as PLB bridges herein. PLB bridges may be used to convert transactions from a 32- and 64-bit format of soft master and slave devices into a 128-bit format, and vice versa. As described below in additional detail, this conversion involves command modification, data mirroring, steering, and packing. Packing is used for burst transfers and line transfers, but is not used for single transfers. Packing of burst transfers is not an inherent requirement for conversion, but is done to improve bandwidth efficiency of crossbar 299.

Each SPLB interface 214 and 215 may include arbitration logic, namely arbiters 227 and 228, respectively, which are shown as part of crossbar 299 for purposes of clarity and not limitation. This is because arbiters 227 and 228 arbitrate access to crossbar 299 as between SPLB and DMA interfaces. However, it should be appreciated that each SPLB interface 214 and 215 and two corresponding DMA controllers, such as DMA interfaces 216 and 217 associated with SPLB interface 214 and DMA interfaces 218 and 219 associated with SPLB interface 215, respectively, share the same crossbar interface logic which may be located in the respective associated SPLB interface.

FIG. 5 is a block diagram depicting an exemplary embodiment of an SPLB interface, such as SPLB interface 214 or 215. For purposes of clarity and not limitation, reference shall be made to SPLB interface 214, which is further described with continuing reference to FIGS. 2 through 5. SPLB interface 214 includes clock and reset control 501, DCR interface 502, address map register 503, SPLB control write state machine 504W, SPLB control read state machine 504R, input command queue 505, slave write output command queue 566, slave read output command queue 506, command conversion/translation module 507, read data buffer/unpacking block 508, write data buffer/packing block 509, master read output command queue 510, master write output command queue 511, master read data state machine 512, and master write data state machine 513.

SPLB interface 214, which in this example is a PLB protocol, is an FPGA fabric 290-to-crossbar 299 bridge that is used to couple a soft master bus instantiated in FPGA fabric 290 to crossbar 299. Thus, it should be appreciated that SPLB interface 214 facilitates access by soft master devices to any and all memory-mapped slave devices in a host integrated circuit in which processor block 110 is embedded that have transactions routed through microprocessor 200. Moreover, this access is not limited to any and all memory-mapped slave devices which are on-chip with respect to the host integrated circuit, but further includes any and all memory-mapped slave devices which are off-chip with respect to the host integrated circuit but which transactions for such slave devices are routed through microprocessor 200.

Furthermore, it should be appreciated that SPLB interface 214 and MPLB interface 213, along with crossbar 299, provide FPGA fabric 290-to-FPGA fabric 290 bridging. As previously indicated, a 128-bit data bus may be implemented, and as described below in additional detail this is done using a 36-bit address bus and memory-mapping to determine if access to such bridge is targeted. For transactions larger than 128 bits wide, byte enables may be used to indicate valid byte lanes. Though specific numerical examples are used for purposes of clarity by way of example, it should be understood that other numerical examples may be implemented.

Transfer types that may be used include single word, cache line, fixed length bursts, and indeterminate burst transfers. Transfers may be unaligned for single word transfers. Word steering, mirroring, conversion cycle, and burst length adjustment may be handled automatically within SPLB interface 214, and likewise MPLB interface 213 with respect to a soft slave device. Accordingly, any combination of 32-, 64-, and 128-bit soft master devices may transact with any 32-, 64-, or 128-bit soft slave devices without having to instantiate glue logic in FPGA fabric 290 for mismatch bus sizes. The avoidance of additional logic facilitates throughput with reduced latency.

When SPLB interface 214 detects an address access targeted for it, SPLB interface 214 responds with an address acknowledgment signal and saves the command in input command queue 505 as indicated by PLB address and control 530. The address acknowledgment signal may happen on the same cycle as the requested transaction, or may occur on a next cycle. By storing input commands in input command queue 505, such commands may be pipelined.

Write commands provided via PLB address and control 530 may be subject to control of SPLB control write state machine 504W and be placed in slave write output command queue 566. Read commands provided via PLB address and control 530 may be controlled by SPLB control read state machine 504R and placed in slave read output command queue 506. Command queues 566 and 506 are thus respectively controlled by state machines 504W and 504R.

Depending on the command, either state machine 504W or 504R places such command from input command queue 505 into command conversion/translation module 507. Commands are translated in module 507. There are four conditions, including any combination thereof, handled by module 507, namely: whether soft master and slave device bus widths differ, and thus lane steering, or mirroring, or extra cycles may be used; whether length of a burst is to be adjusted for mismatched bus widths; whether a maximum length of a burst has been exceeded, and thus broken up into multiple commands; or whether transfers are misaligned. Additionally, output from command conversion/translation module 507 is crossbar PLB address/transfer qualifier 527 and memory interface address/transfer qualifier 529.

When a command is ready to be issued to crossbar 299, the requested transaction goes active and when granted the command associated therewith is put into an output command queue and removed from an input command queue. Thus, a command in input command queue 505 for a write is placed in master write output command queue 511, and a read in input command queue 505 is placed in master read output command queue 510, after being processed as applicable by module 507.

A requested transaction may thus be sent to an output queue on the cycle immediately following the cycle in which such command for the requested transaction was saved in input command queue 505. Output command queues 510 and 511 contain any and all commands awaiting a data phase, namely an indication that a write has transpired for commands in command queue 511 or that resulting data from a read is sent back to SPLB interface 214 for commands in command queue 510.

Master read data state machine 512 and master write data state machine 513 are responsible for reads and writes, respectively, during a data phase. State machines 512 and 513 via crossbar-to-PLB bus 528 detect the beginning, namely the first data acknowledgment, and end of a data phase. Examples of the end of a data phase include a soft slave device terminating a burst, an end of a single cycle, a cache line complete indication, a data write buffer empty indication, and a data read buffer full indication. Once a command finishes, state machines 512 and 513 process a next command's data phase for any next command in command queues 510 and 511, respectively.

Write data buffer/packing block 509 may optionally be used to take up slack between FPGA fabric 290 and crossbar 299 to allow more efficient use of crossbar 299. PLB write data 525 is provided to write data buffer/packing block 509. Write data buffer/packing block 509 is responsible for packing data, as previously described. Thus, packed crossbar PLB write data 526 may be provided from write data buffer/packing block 509 to crossbar 299.

Read data buffer/unpacking block 508 receives read data 524 and provides unpacked crossbar PLB read data 522. Optional unpacking of packed read data by read data buffer/unpacking block 508 takes up slack between FPGA fabric 290 and crossbar 299 allowing for more efficient use of crossbar 299. Read data buffer/unpacking block 508 is responsible for unpacking read data, if such read data includes packed data bits. Examples of packing conventionally include zero packing. Thus, it should be appreciated that buffers 508 and 509 may allow for continuous movement of data via pipelining to allow for any latency due to arbitrated access to crossbar 299.

DCR bus input 521 is provided to DCR interface 502 which may provide DCR bus output 523. Address information may be provided via DCR interface 502 to address map register 503 for setting address values for one or both of state machines 504W and 504R.

Output command queues 510 and 511 keep track of commands in the order in which they are issued. Thus, while commands are processed in the order in which they are received, subsequent reads and writes therefor may be executed concurrently.

Write data buffer/packing block 509 may be a posting buffer for writes. Thus, writes may be buffered sufficiently so that MPLB interface 213 is at least rarely throttled back with respect to receiving a continuous stream of pipelined data. Command processing, however, may be stopped to avoid overflow or under-run conditions of block 509. Furthermore, it should be appreciated that data in block 509 may be for multiple commands, and thus tracking of which commands are associated with which data in block 509 is maintained.

There may be one read data buffer/unpacking block or sub-block 508 for each soft slave device. Read data buffer/unpacking block 508 may include data for multiple commands, and thus tracking of which command is associated with which data in such buffer is maintained. Commands may be stopped to avoid overflow or under-run conditions of block 508. If a soft master device terminates a burst, read data buffer/unpacking block 508 may be flushed of any read data associated with such terminated burst.

Figure 6:
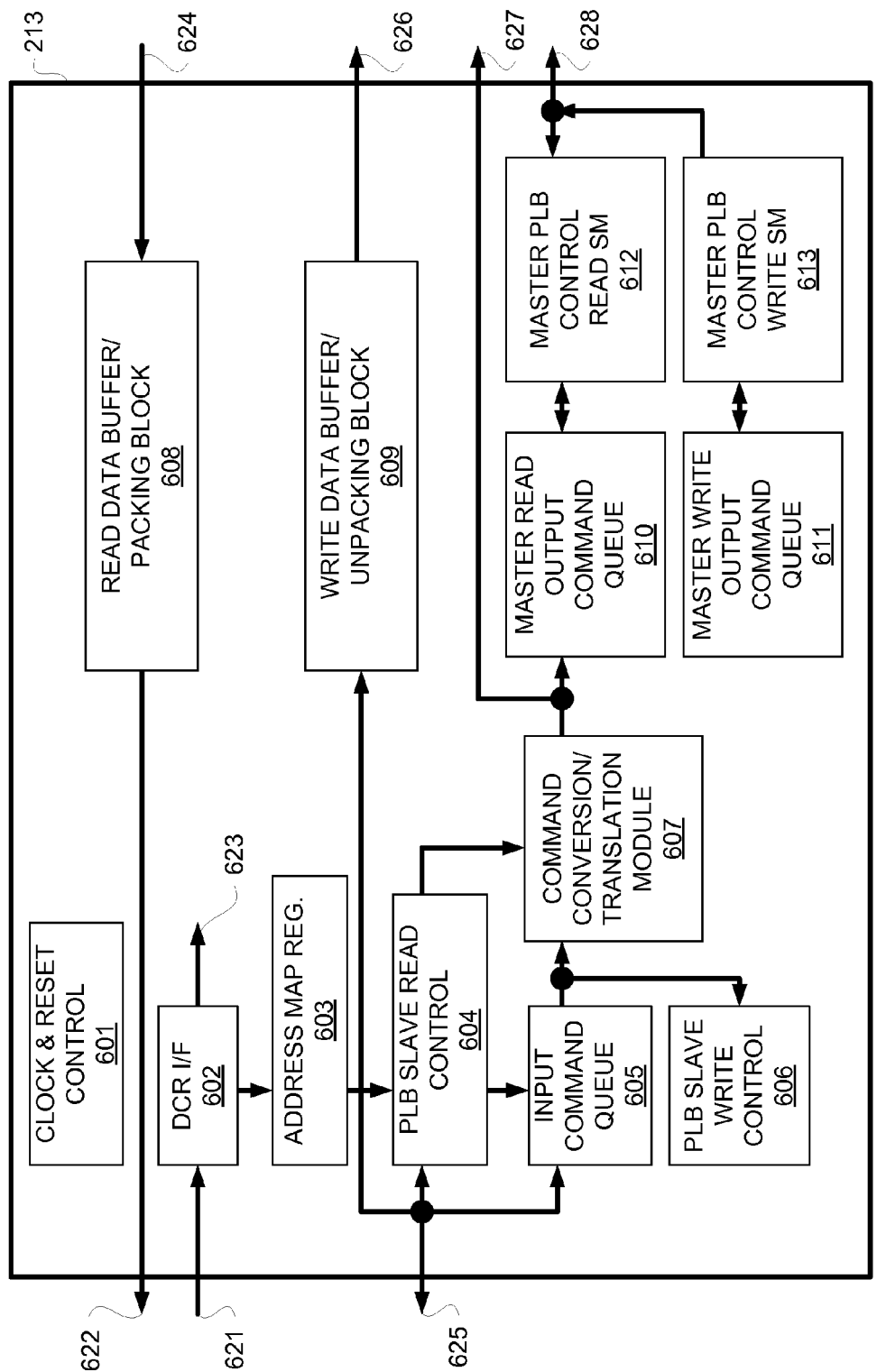
FIG. 6 is a block diagram depicting an exemplary embodiment of a master processor local bus interface block ("MPLB interface") of the processor block of FIGS. 2 through 4.

FIG. 6 is a block diagram depicting an exemplary embodiment of MPLB interface 213. MPLB interface 213 includes clock and reset control block 601, DCR interface 602, address map register 603, PLB slave read control 604, input command queue 605, PLB slave write control 606, command conversion/translation module 607, read data buffer/packing block 608, write data buffer/unpacking block 609, master read output command queue 610, master write output command queue 611, master PLB control read state machine 612, and master PLB control write state machine 613. With continuous reference to FIGS. 2 through 6, MPLB interface 213 is further described.

MPLB interface 213 couples crossbar 299 to a slave bus side of FPGA fabric 290. Thus, soft master devices as well as microprocessor 200 have access to all memory-mapped locations on or off chip that are routed through processor block 110. MPLB interface 213 is similar to SPLB interface 214 of FIG. 5, and accordingly much of the same description is not repeated.

Crossbar-to-PLB bus 625 receives commands which are provided to input command queue 604. When MPLB interface 213 detects an address access to itself it responds by sending an address acknowledgment to crossbar 299 and saves the command in input command queue 605. Again, the address acknowledgment may happen on the same cycle as the request is received by MPLB interface 213 or on a subsequent cycle, which cycle is programmable by a user by setting register values. Again, storing command and queues such as input command queue 605 facilitates command pipelining. As previously described there are four conditions any combination of which or any of which may affect the command translation as done by command conversion/translation module 607.

When a command is ready to be issued to a PLB slave bus instantiated in FPGA fabric 290, the request goes active. The command for such request is provided to an output command queue responsive to being granted. Input command queue is controlled by PLB slave write control 606 for writes and PLB slave read control 604 for reads. Commands are placed in either of command queues 610 or 611 depending on whether they are a read or a write, respectively.

Command queues 610 and 611 are respectively controlled by master PLB control read state machine 612 and master PLB control write state machine 613. State machines 612 and 613 are responsible for data phase of a transaction. More particularly, such state machines detect beginning, namely first data acknowledgment, and end of a data phase. Examples of end of data phases are previously described, and thus are not repeated.

Once a command finishes, state machines 612 and 613 cause a next command, such as may be in associated command queues 610 and 611, respectively, to issue another command. Once a command finishes, state machines 612 and 613 process the data phase of such command for reads and writes, respectively. DCR interface 602, including DCR bus input 621 and output 622, as well as address map register 603, are similar with respect to like elements described with reference to SPLB 214, and thus are not repeated.

Likewise, read data buffer/packing block 608 and write data buffer/unpacking block 609 are similar to blocks 508 and 509, respectively, of FIG. 5. However, it should be appreciated that write data buffer/unpacking block 609 unpacks data, namely data packed for the 128 native bit width of crossbar 299 for example as such data is output as fabric PLB write data 626. Likewise, fabric PLB read data 624 is read from FPGA fabric 290 for placing in read data buffer/packing block 608, and such data may be packed for the native bit width of crossbar 299 for example as crossbar PLB read data 622.

Again, reads and writes may be executed concurrently. Other operations of blocks 610 through 613 correspond respectively to blocks 510 through 513 of FIG. 5, and thus are not repeated.

Crossbar PLB bus 625 may be used to provide crossbar PLB write data as input to write data buffer/unpacking block 609. Output from command conversion/translation module 607 may be provided as FPGA fabric slave address/transfer qualifier 627. FPGA fabric control and status interface 628 from state machine 613 may be used for obtaining and providing control and status information as between MPLB interface 213 and FPGA fabric 290.

Each of interfaces 214 and 213 includes a slave side and a master side. The slave side of SPLB interface 214 is in a clock domain associated with FPGA fabric 290. The master side of SPLB interface 214 is a clock domain associated with crossbar 299. The slave side of MPLB interface 213 is associated with a clock domain of crossbar 299, and the master side of MPLB interface 213 is associated with a clock domain of FPGA fabric 290.

However, rate adaptation in SPLB interface 214 is essentially as in MPLB interface 213. Both SPLB interface 214 and MPLB interface 213 carry out command conversion when a corresponding soft master device or soft slave device is not configured for 128-bit data width busing; however, their command conversion processes as instantiated respectively in command conversion/translation module 507 and command conversion/translation module 607 are not the same. More particularly, command translation in SPLB interface 214 breaks down long bursts into shorter, fixed-size bursts, and there is no such equivalent in MPLB interface 213.

Even though the slave side of SPLB interface 214 operates at the clock rate of an FPGA fabric 290 clock signal, the master side of SPLB interface 214 is clocked by a clock signal used to clock crossbar 299. Similarly, the master side of MPLB interface 213 employs a clock enable signal to reduce the crossbar clock rate for communicating with the clock rate of FPGA fabric 290. The slave side of MPLB interface 213 is clocked using the clock frequency of crossbar 299. Signals crossing the two clock domains in each of interfaces 214 and 213 may be synchronized, such as by FIFOs or by synchronizers and pulse stretchers.

Fabric-to-crossbar data FIFOs include write data buffer/packing block 509 and read data buffer/packing block 508. Crossbar-to-fabric data FIFOs include read data buffer/unpacking block 608 and write data buffer/unpacking block 609. Fabric-to-crossbar data FIFOs provide a temporary storage for transit data from fabric towards crossbar 299. These FIFOs may support dynamic bus sizing by including data packing logic that allows SPLB-write/MPLB-reads to connect to PLB soft master/slave devices that have 32-bit, 64-bit, or 128-bit data buses. Soft master/slave devices may have different bus widths, and thus mixing of different bus widths may be implemented.

Write data buffer/packing block 509 of SPLB interface 214 and read data buffer/packing block 608 MPLB interface 213 have write and read data respectively come into those FIFOs from FPGA fabric 290 in 128-bit increments, even for 32-bit or 64-bit soft master or soft slave devices. Data that comes from a 32-bit soft master or slave device is mirrored to all four word locations; similarly, data from a 64-bit soft master or slave device is mirrored to both lower and higher 64-bit data locations. Packing logic of blocks 509 and 608 may be used to pack 32-bit or 64-bit soft master/slave device data into proper locations within a quad word.

FIGS. 7A through 7D are respective block diagrams depicting exemplary embodiments of FPGA fabric-to-crossbar bridging with respect to FIGS. 7A and 7C, and crossbar-to-FPGA fabric bridging with respect to FIGS. 7B and 7D. FPGA fabric-to-crossbar bridging and crossbar-to-FPGA fabric bridging respectively of FIGS. 7A through 7D are further described with simultaneous reference to FIGS. 2 through 6.

In FIG. 7A, SPLB interface 214 includes a write data FIFO with packing logic, namely block 509. Block 509 provides time domain interfacing from a slave side 731 of SPLB interface 214 and master side 732 of SPLB interface 214. It should be appreciated that there are separate write and read clock domains.

For a write operation, as generally indicated by write data arrow 710, being provided to SPLB interface 214 from FPGA fabric 290, such write data is provided to an input interface 721 for providing to block 509. This write data enters on a slave side 731 of SPLB interface 214, and slave-side 731 may be clocked at a fraction of the clock rate of crossbar 299, namely the clock rate of crossbar 299 divided by a first integer. Input interface 721 thus provides write data 710 to block 509 at a lower frequency than that of crossbar 299. However, write data 710 is obtained from block 509 at the frequency of crossbar 299, namely the clock domain associated with master side 732 of SPLB interface 214, for providing to output interface 722 of SPLB interface 214. Output interface 722 provides such write data 710 to crossbar 299.

Packing logic included as part of block 509 supports dynamic bus sizing. As illustratively shown, a 32-bit soft master 701, a 64-bit soft master 702, and a 128-bit soft master 703 may all be instantiated in FPGA fabric and coupled to a soft arbiter 712. Soft arbiter 712 is configured for a PLB protocol with a data bus that corresponds to the data bus width of a native data bus width of SPLB interface 214. Thus, pack and push FIFO control signals may be used for packing of data from a 32-bit or a 64-bit soft master device for packing data into a write data FIFO of block 509 using packing logic of block 509 and for obtaining 128-bit increments therefrom, respectively. Soft arbiter 712 may include a mirroring block for mirroring data prior to providing to a FIFO of block 509.

In FIG. 7B, soft slave devices 704 through 706 respectively may be 32-bit, 64-bit, and 128-bit data bus devices. Output of soft slave devices 704 through 706 may be provided to a soft arbiter 713 for providing read data 711 thereto. Thus again, dynamic bus sizing is supported along with output data mirroring logic. Thus, block 608 of MPLB interface 213 may include input mirroring logic prior to providing read data 711 to a FIFO of block 608. Soft arbiter 713 may configure input data for a 128-bit data bus using a PLB protocol. Read data 711 is provided from soft arbiter 713 to input interface 724 of MPLB interface 213 on a master side 734 thereof. Master side 734 of MPLB interface 213 is operated at a fraction of clock rate of crossbar 299, namely the clock rate of crossbar 299 divided by a second integer, namely a reduced frequency with respect to the clock rate of crossbar 299. The clock rate at which slave side 731 of SPLB interface 214 is operated may, though need not, be the same as the clock rate at which master side 734 of MPLB interface 213 is operated. In other words, the first integer as described above for dividing the clock rate of crossbar 299 to obtain the clock rate of slave side 731 may, though need not, equal the second integer for dividing the clock rate of crossbar 299 to obtain the clock rate of master side 734.

Continuing the description of FIG. 7B, read data 711 is provided from input interface 724 to block 608 at the reduced frequency associated with master side 734. Such data may be mirrored in block 608 before being stored in a FIFO thereof. For example, mirroring logic may mirror valid data from upper word lanes to lower word lanes for use by 32-bit or a 64-bit target soft slave, such as 32-bit soft slave 704 or 64-bit soft slave 705. This mirroring may be controlled from outside of the FIFO of block 608 and the number of mirroring cycles may vary for each 128-bit transfer.

Read data 711 is read out from a FIFO of block 608 to a slave side 733 of MPLB interface 213 for providing to output interface 723. Such read data 711 is provided from output interface 723 to crossbar 299. The reading out of data from a FIFO of block 608 is done at the frequency of crossbar 299, namely the clock domain associated with slave side 733. Likewise, output interface 723 operates at the clock frequency rate of crossbar 299.

With reference to FIG. 7C, soft masters 701 through 703 may receive read data 711. Data from crossbar 299 is provided at 128-bit width to input interface 742 of SPLB interface 214. Input interface 742 is on a master side 732 of SPLB interface 214, and master side 732 is operated at the clock frequency of crossbar 299. Read data 711 is provided from input interface 742 to a FIFO of block 508 with unpacking logic.

Read data 711 is read out of the FIFO of block 508 into an output interface 741 of SPLB interface 214. Output interface 741 is on a slave side 731 of SPLB interface 214, and such slave side 731 is operated at a lower clock frequency than that of crossbar 299, namely the clock rate of crossbar 299 divided by a first integer value. Thus, read data 711 is read out of a FIFO of block 508 at lower frequency than such data is written into such FIFO.

Read data 711 is provided from output interface 741 to a soft arbiter 712 configured for a 128-bit data width and a PLB protocol. Read data 711 is provided to a requesting master device in the data bit width of such master device. Thus, for example, soft master device 701 would receive data in 32-bit width increments if it was the requesting master device.

With reference to FIG. 7D, write data 710 is provided from crossbar 299 to input interface 743 of MPLB interface 213 on a slave side 733 thereof. Write data 710 is provided from input interface 743 to FIFO of block 609. Write data 710 is loaded into such FIFO of block 609 at a frequency associated with slave side 733, namely the clock frequency of crossbar 299. Write data 710 is output from such FIFO of block 609 with unpacking logic to output interface 744 of a master side 734 of MPLB interface 213. Write data 710 is clocked out of a FIFO of block 609 at a lower clock frequency than that of crossbar 299, namely the clock rate of crossbar 299 divided by a second integer value.

Write data 710 is provided to a target master device via soft arbiter 713 as such write data is output from output interface 744. Thus, for example, if the target slave device was soft slave 705, which is configured for a 64-bit data width, soft arbiter 713, which is configured to receive data at 128-bits with a PLB interface, sends such data in 64-bit increments to soft slave device 705.

Figure 8:
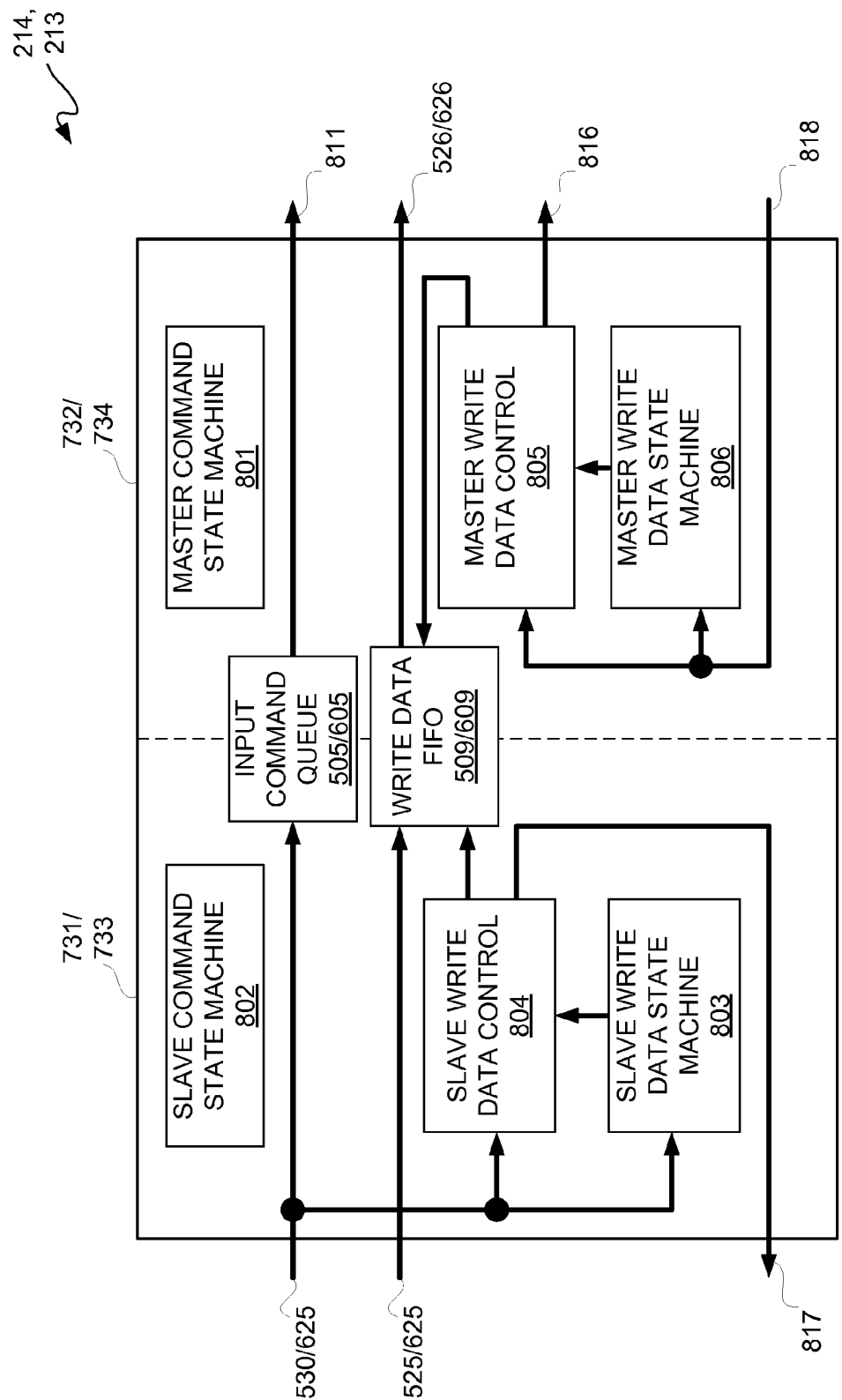
FIG. 8 is a block diagram depicting a write data control logic for the SPLB interface of FIG. 5 or the MPLB interface of FIG. 6.

FIG. 8 is a block diagram depicting write data control logic for SPLB interface 214 or MPLB interface 213. SPLB interface 214 and MPLB interface 213 are controlled by logic; however, unlike the previous description of data FIFOs with reference to FIGS. 5 and 6, for purposes of clarity data control logic is categorized herein according to function rather than direction of data flow. Accordingly, blocks in FIG. 8 replace blocks previously described in FIGS. 5 and 6. Furthermore, for purposes of clarity, FIG. 8 shall be described as though an SPLB interface 214 is described with differences for MPLB interface 213 mentioned, as the description of SPLB interface 214 likewise is applicable to MPLB interface 213.

Slave side 731 of SPLB interface 214 includes slave command state machine 802, slave write data control 804, and slave write data state machine 803, as well as input sides of input command queue 505 and write data FIFO 509. Master side 732 of SPLB interface 214 includes master command state machine 801, master write data control 805, and master write data state machine 806, as well as output portions of input command queue 505 and write data FIFO 509. It should be appreciated that slave and master sides 731 and 732 are respectively interchangeable with slave and master sides 733 and 734, and likewise input command queue 505 and write data FIFO 509 are interchangeable with input command queue 605 and write data FIFO 609.

For SPLB interface 214, the connection on the left is to a soft master and the connection on the right is to crossbar 299. For MPLB interface 213, the connection on the left is to crossbar 299 and the connection on the right is to a soft slave. A write command and address 530 for SPLB interface 214, or 625 for MPLB interface 213, is input to input command queue 505, or 605, slave write data control block 804, and slave write data state machine 803. Write data 525, or 625, is provided to write data FIFO 509, or 609. Write data FIFO 509 provides write data 526 to crossbar 299, and write data FIFO 609 provides write data 626 to soft arbiter 713 for soft slave devices.

Output of slave write data control block 804 is a write acknowledgment signal 817, and another output of slave write data control block 804 is provided to a write data FIFO. An address and command is output from input command queue 505/605 for SPLB interface 214/MPLB interface 213 as address command signal 811. This command indicates a write and starting address for the write, and in response, a write acknowledgment signal 818 is provided to master write data control 805 and master write data state machine 806. Output from master write data control 805 is control signaling 816.

Slave write data state machine 803 controls slave write data control 804 for controlling write data FIFO 509. Likewise, master write data state machine 806 controls master write data control block 805, and master write data control block 805 controls write data FIFO 509 for outputting write data. Though the particular PLB protocol described herein is for a version 4.6 PLB protocol available from IBM, it should be appreciated that other interface protocols may be used, whether or not such protocols are used for a Power PC microprocessor. Additionally, the master side 732 or 734 is capable of running at 16 times the frequency of the slave side 731 or 733 for this particular example; however, higher or lower integer ratios may be used.

For an SPLB interface 214, control signal 816 may be used to indicate that the master side 732 has a transaction for crossbar 299. For an MPLB interface 213, master side 734 may indicate by control signal 816 that a transaction is ready for a soft slave device.

Write data is pushed into write data FIFO 509, or 609, under control of write data control logic of a slave side 731, or 733, and popped from FIFO 509, or 609, under control of write data control logic of master side 732, or 734. Slave write data control block 804 and master write data control block 805 drive slave side and master side control logic, respectively.

State machines, such as state machines 801, 806, 802, and 803, are used to generate control sequences for three different types of write data transactions, namely single write transactions, line write transactions, and fixed length burst write transactions. Support for single line transfers, as well as 4-, 8-, and 16-word line transfers, may be provided. Furthermore, 32-bit, 64-bit, and 128-bit burst transfers may be used. A 4-word line transfer may be converted into a single line transfer.

Figure 9:
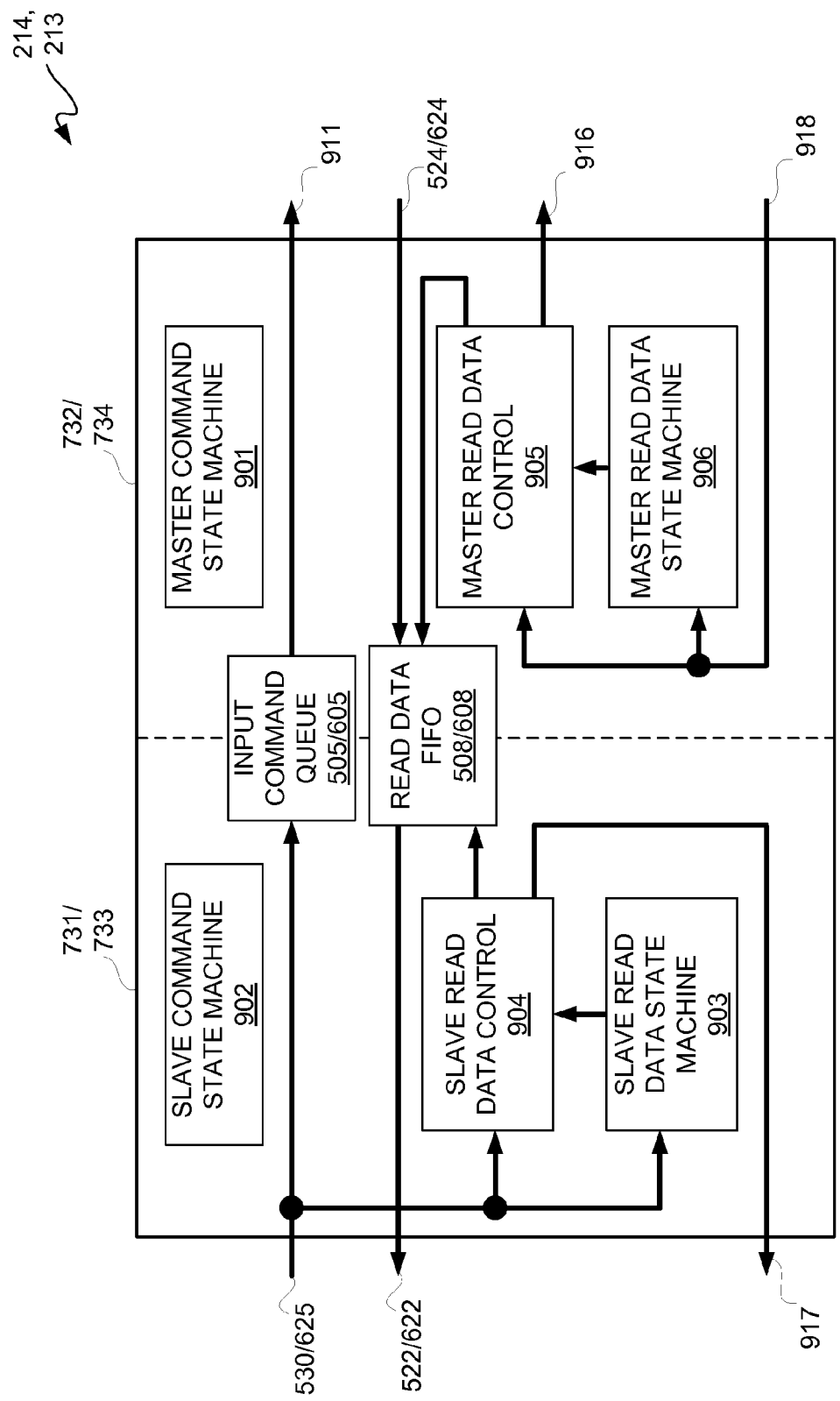
FIG. 9 is a block diagram depicting an exemplary embodiment of a read data control logic for the SPLB interface of FIG. 5 or the MPLB interface of FIG. 6.

FIG. 9 is a block diagram depicting an exemplary embodiment of a read data control logic for an SPLB interface 214 or an MPLB interface 213. Again, as SPLB interface 214 and MPLB interface 213 are similar with respect to read data control, to reduce repetition SPLB interface 214 is described with less reference to MPLB interface 213.

SPLB interface 214 includes a slave side 731 and a master side 732, and MPLB interface 213 includes a slave side 733 and a master side 734. Slave sides 731 and 733 include slave command state machine 902, slave read data control 904, slave read data state machine 903, input command queue 505, and read data FIFO 508. Master sides 732 and 734 include master command state machine 901, master read data control block 905, master read data state machine 906, input command queue 605, and read data FIFO 608.

Accordingly, it should be appreciated that because FIG. 9 depicts read data control logic, the direction of data flow is changed from that in FIG. 8. However like FIG. 8, for SPLB interface 214 the left side of FIG. 9 is coupled to a soft master device instantiated in FPGA fabric 290, and for MPLB interface 213 the left side is coupled to crossbar 299. The right side of the figure in FIG. 9 is coupled to crossbar 299 for SPLB interface 214 and coupled to a soft slave device instantiated in FPGA fabric 290 for MPLB interface 213.

Read command and address may be provided for interfaces 214 and 213 via inputs 530 and 625, respectively, to input command queue 505 and 605, respectively, as well as to associated slave read data control blocks 904 and slave read data state machines 903. The address and command may be output from such input command queues as signaling 911. Read data 524 or 624 may be provided to read data FIFO 508 or 608, respectively, for providing read data output 522 or 622, respectively. Signals 917 and 918 correspond to signals 817 and 818 of FIG. 8, except these are read acknowledgment signals. Signal 916 corresponds to signal 816 of FIG. 8. Likewise, blocks 903 through 906 respectively correspond to blocks 803 through 806 of FIG. 8, except blocks 903 through 906 are for read operations not write operations as in FIG. 8.

Figure 10:
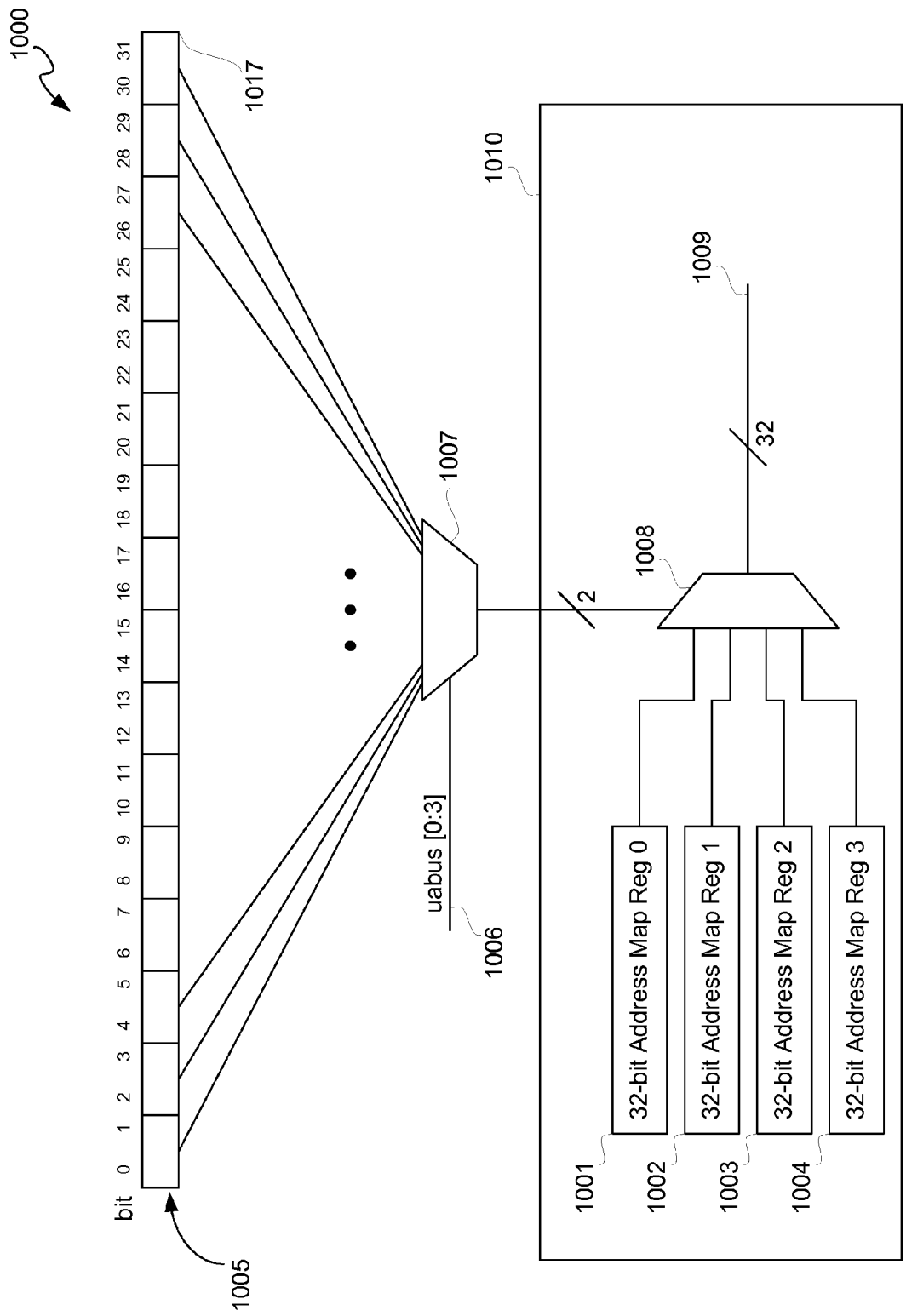
FIG. 10 is a block/schematic diagram depicting an exemplary embodiment of an SPLB address mapping register selection circuit.

Crossbar 299 accepts requests from multiple PLB masters and funnels them through to either memory controller interface 212 or MPLB interface 213 based on an address map, which may be programmed by a user. FIG. 10 is a block/schematic diagram depicting an exemplary embodiment of an SPLB address mapping register selection circuit 1000. Specific bit values are used for purposes of clarity by way of example and not limitation, as it shall be appreciated that other bit values may be used for address mapping as described herein. Moreover, even though specific address values are illustratively shown, it should be appreciated that other values, including other forms of segmentation, may be used in accordance with the following description.

Masters on a PLB have access to a 36-bit address bus, namely a 4-bit upper address bus and a 32 bit lower address bus. The 36 address bits cover a 64 gigabyte ("GB") address range where the 32-bit lower address bus covers a 4-GB address range. The address map, such as address map 1000, is programmed by a 32-bit template selection register 1005, and four 32-bit address template registers 1001 through 1004. These 32-bit registers are DCR programmable and get their reset values from attribute pins associated with processor block 110.

Template selection register 1005 is a 32-bit register which consists of a concatenation of sixteen 2-bit values. On receiving a request, crossbar 299 examines the four upper address bits and indexes them into template selection register 1005 to obtain a 2-bit value. The two bits determine which of the four address template registers 1001 through 1004 are to be used for a received request.

The four address template registers 1001 through 1004 are each 32 bits wide, where each bit represents one thirty-second of a 4-GB address space, namely 128 megabytes ("MB") each. Crossbar 299 uses the most significant five bits of the lower address bus to index into the selected address template register to obtain a single bit value. If the bit in the address template register is set, a request to that 128-MB address space is directed to memory controller interface 212, and if it is cleared the request is directed to MPLB interface 213.

A 4-bit upper address bus is used to select one of four 4-GB address spaces. Each 4-GB address space is configurable through a 32-bit register representing 32 regions each of a size of 128 MBs. Thus, an address provided to an SPLB interface, such as SPLB interfaces 214 or 215, is used by such interface to determine whether it is to acknowledge that a transaction request is for such interface. In other words, an address map in an SPLB interface determines whether such SPLB should acknowledge a transaction requested by a soft master device.

An address map in each of SPLB interfaces 214 and 215 is defined by a set of four 32-bit address mapping control registers 1001 through 1004, which are generally indicated as 32-bit Address Map Register 0 through 32-bit Address Map Register 3, respectively. Only one of the four address map registers 1001 through 1004 is active at a time. The selection of which of address map registers 1001 through 1004 is active is determined by a 32-bit template selection register 1005, which may be located externally to an SPLB interface in which the address map is located. Thus for example, template selection register 1005 may be instantiated in FPGA fabric 290.

Template selection register 1005 includes 16 2-bit fields 1017, where each 2-bit field corresponds to a 4-GB address space, as described below in additional detail. The upper four bits of a 36-bit address are used to look-up a 2-bit value in template selection register 1005, which in turn selects one of four address mapping control registers, namely address map registers 1001 through 1004. This upper four bits is generally indicated as upper address bus [0:3] 1006, which is provided to a control select port of multiplexer 1007. Data input to multiplexer 1007 are the sixteen 2-bit fields, namely 32 bits, of template selection register 1005.

A selected 2 bits output from multiplexer 1007 are provided as a control select input to multiplexer 1008. Data inputs to multiplexer 1008 are the respective 32 bits of each of address map registers 1001 through 1004, of which one is selected for output as an SPLB address mapping control address 1009. The address mapping control block 1010 is part of each SPLB interface, such as SPLB interfaces 214 and 215.

Each 32-bit address map register 1001 through 1004 as previously described divides a 4-GB address space into 32 regions, each of which covers a 128-MB address area. If a bit in an address map register 1001 for example is set, the corresponding 128-MB address space is recognized by the SPLB interface in which address mapping control block 1010 is located.

Figure 11:
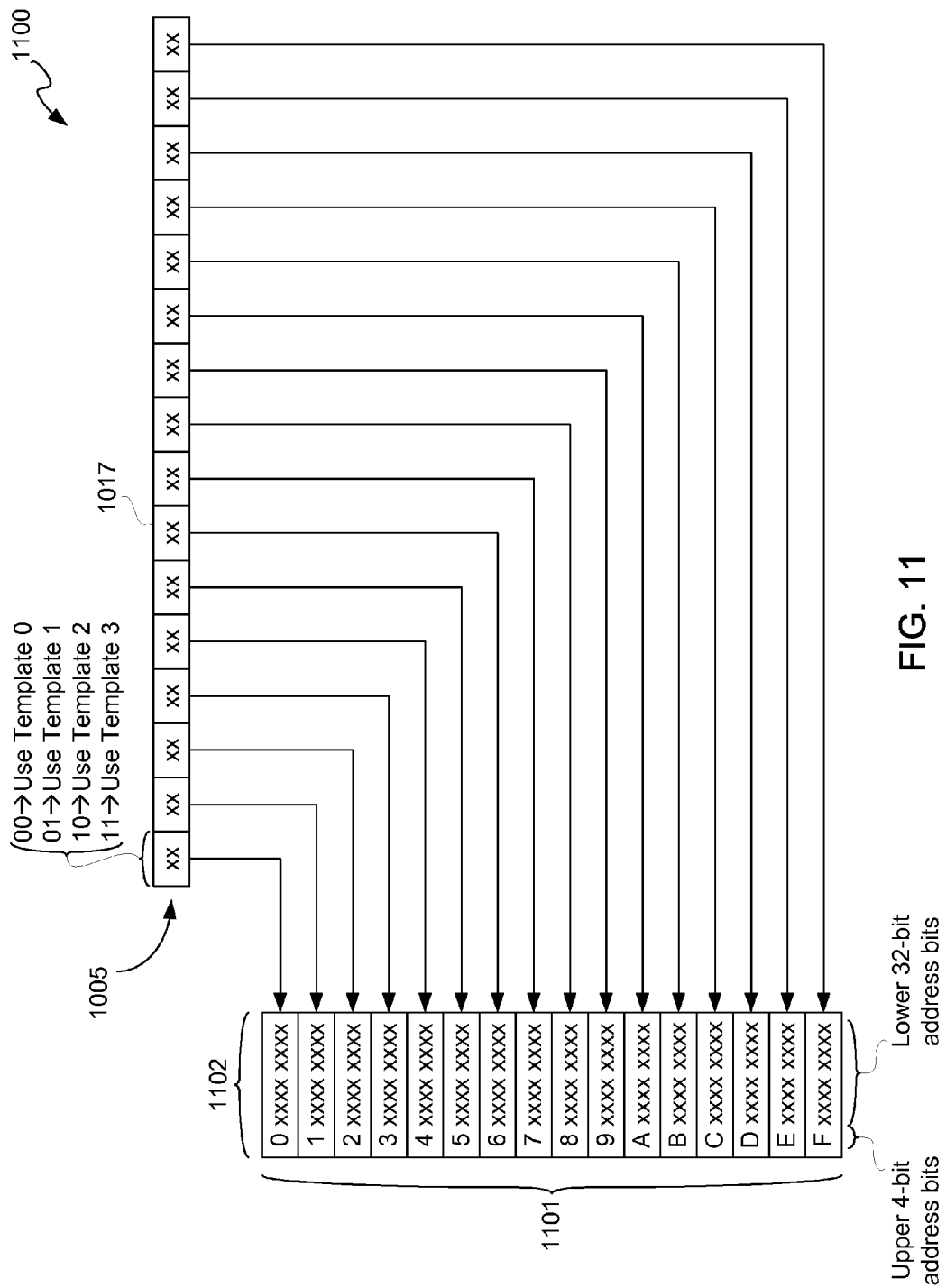
FIG. 11 is a block diagram depicting an exemplary embodiment of a division of address space.

FIG. 11 is a block diagram depicting an exemplary embodiment of a division of address space 1100 as previously described with reference to FIG. 10. Template selection register 1005 includes sixteen 2-bit fields 1017 that correspond to a segmented 64-GB address space 1102. Address space 1102 is divided into sixteen 4-GB address space segments 1101 labeled in hexadecimal 0 through F.

Figure 12:
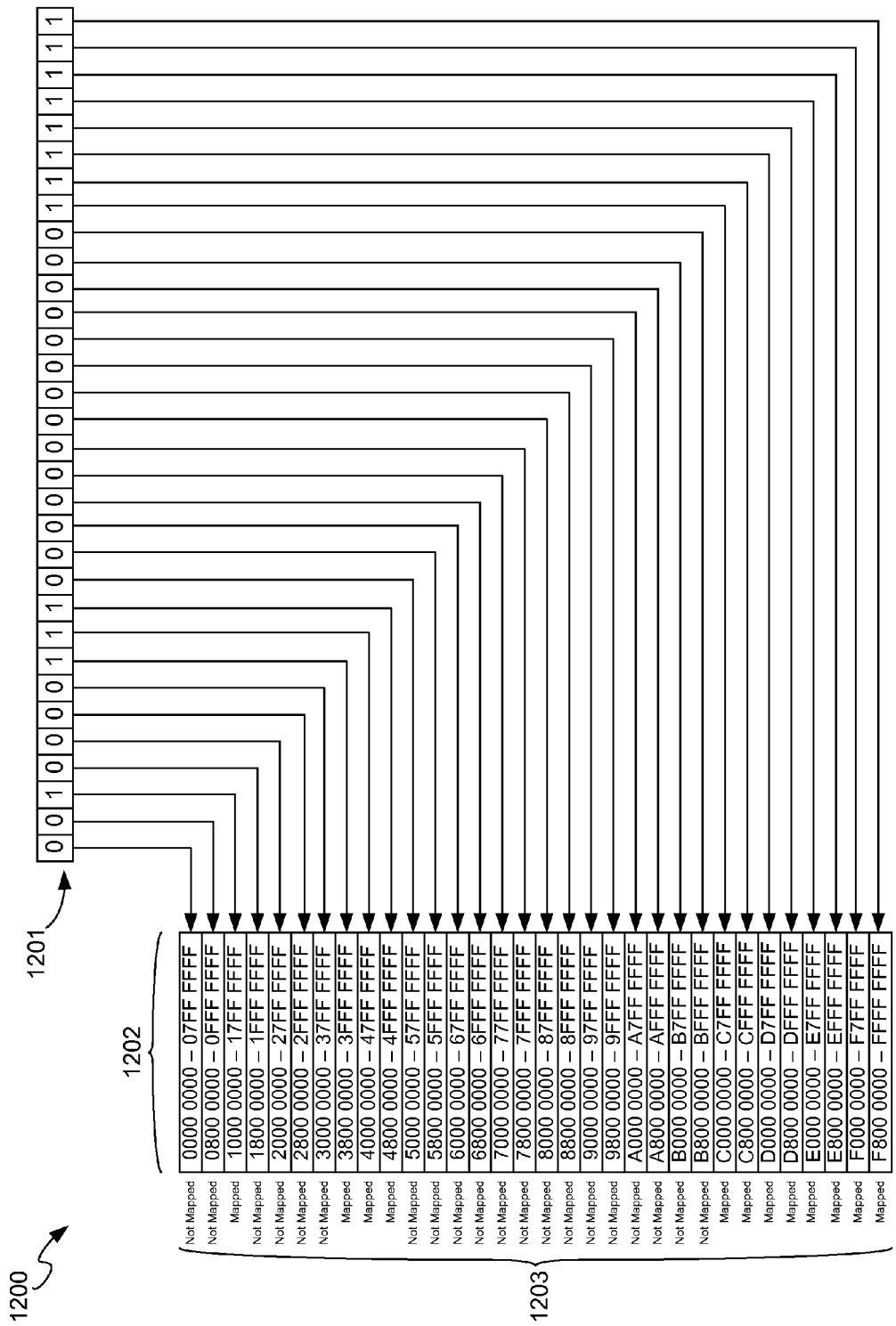
FIG. 12 is a block diagram depicting an exemplary embodiment of an address mapping.

For purposes of clarity by way of example and not limitation, FIG. 12 is a block diagram depicting an exemplary embodiment of an address mapping 1200 that may be used for mapping to interfaces 212 and 213 for example. Bits 1201 indicate the bit values set in an address map register, such as address map register 1001 of FIG. 10 for an SPLB interface, such as SPLB interface 214.

For a 4-GB memory space selected by template selection register 1005 of FIGS. 10 and 11, thirty-two bits 1201 respectively correspond to thirty-two 128-MB segments of a 4-GB memory space, which in this example is memory space 1202 having thirty-two 128-MB segments 1203. Bits of bits 1201 having a logic 0 value are unmapped memory segments of memory segments 1203, and bits having a logic 1 value of bits 1201 are mapped 128-MB memory segments of memory segments 1203.

Accordingly, it should be appreciated that each 4-GB address segment of 4-GB address segments 1102 of FIG. 11 may have one or more 128 MB address spaces for either of MPLB interface 213 or memory controller interface 212. Moreover, one or more of such mapped 128-MB address spaces may be mapped to the other of interfaces 212 and 213.

One of the differences between MPLB interface 213 and SPLB interfaces 214 and 215 that should be appreciated from the above description is that MPLB interface 213 supports fixed length transfers of 128 bits. It should be appreciated that SPLB interface 214 for example is configured to adjust 32- or 64-bit data transfers from a soft master device into 128-bit native transfers for crossbar 299 as well as MPLB interface 213, or for that matter memory controller interface 212.

MPLB interface 213 does carry out bus width adaptation between 32- and 64-bit soft slave devices and the native 128-bit architecture, even though only fixed length transfers are used. In other words, because SPLB interfaces 214 and 215 configure transfers for 128-bit native data busing, MPLB interface 213 does not have to handle anything other than fixed length transfers. Furthermore, it should be appreciated that with respect to a soft slave device, MPLB interface 213 is a master and therefore using a fixed 128-bit transfer to a soft arbiter simplifies design of such arbiter. In contrast, a soft master device may be any of a variety of data bit widths as described herein, and thus SPLB interfaces 214 and 215 may be configured to handle such various data bit widths.

Fixed length burst transfers may be terminated after completion or prior to completion, namely early termination. For termination after a completed burst transfer, a master device and a slave device terminate a burst transfer after a fixed number of transfers as set by a burst length value in an address phase of a transaction. Once the fixed number of transfers has completed, the burst transfer is completed or terminated. For an early termination of a burst transfer, either a master device or a slave device terminates such burst transfer before the scheduled end thereof.

Figure 13:
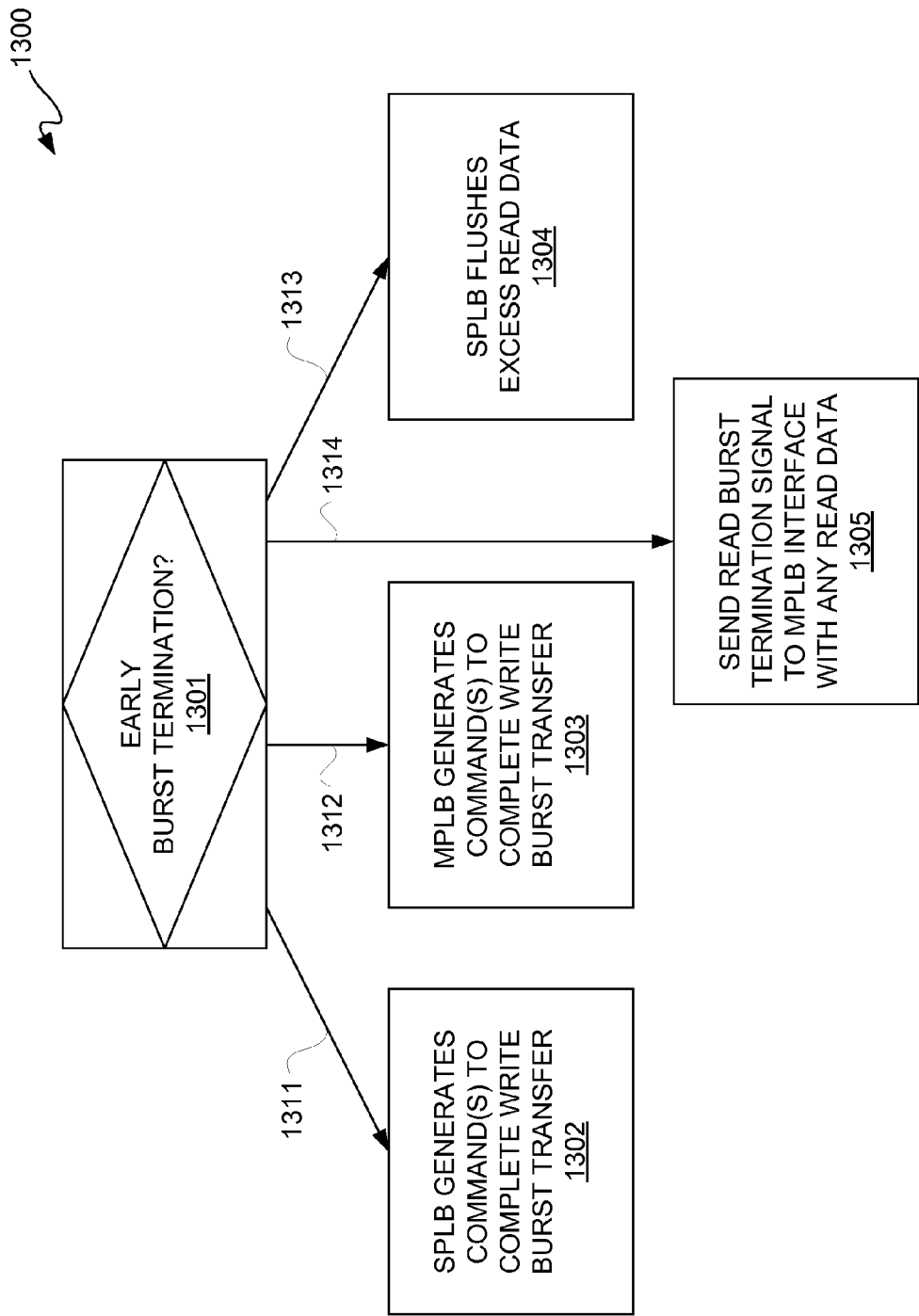
FIG. 13 is a flow diagram depicting an exemplary embodiment of an early termination flow.

FIG. 13 is a flow diagram depicting an exemplary embodiment of an early termination flow 1300. There are multiple events that may result in an early termination of a burst transfer. At 1301, it is determined whether an early burst termination has occurred and, if so, the type of early burst termination.

An early write burst transfer is terminated by a master device, as generally indicated by arrow 1311. An SPLB interface, such as SPLB interface 214 and 215, generates one or more new commands at 1302 to complete an early terminated write burst command, and thus such a termination is transparent to memory controller interface 212 and MPLB interface 213.

Another possible instance is where is the write burst transfer is terminated early by a slave device, as generally indicated by arrow 1312. Such an early write burst termination originates from a PLB slave device, such as a soft slave device for example, that is coupled to MPLB interface 213 for coupling via crossbar 299 to a master device. In the instance of a slave device early write burst termination, MPLB interface 213 generates one or more new commands at 1303 to complete an early terminated write burst command, and thus such a termination is transparent to the master device originating the write burst instruction. A memory controller, such as a soft memory controller slave device, coupled to memory controller interface 212 does not terminate a write burst early.

Early termination of a read burst transfer may be done by a master device, as generally indicated by arrow 1313. An SPLB interface, such as SPLB interface 214 or 215, flushes out excess read data from a soft slave device associated with such read burst transfer which is terminated early by a master device at 1304.

For early termination of a read burst transfer terminated by a slave device as generally indicated by arrow 1314, such early termination originates from a PLB slave device coupled to MPLB interface 213. In the instance of a slave device early read burst termination, MPLB interface 213 generates one or more new commands at 1305 to complete an early terminated read burst command, and thus such a termination is transparent to the master device originating the read burst instruction. A memory controller, such as a soft memory controller slave device, coupled to memory controller interface 212 does not terminate a read burst early.

Furthermore, there may be instances in which a transfer request times out. When a soft PLB slave device coupled to MPLB interface 213 does not respond to a transfer request therefrom, a soft arbiter coupled to MPLB interface 213 may be configured to initiate a timed out signal which is provided to MPLB interface 213. This timed out signal may cause MPLB interface to flush the command associated therewith from the command queue. For a timed out write command, MPLB interface 213 may be configured to flush the command and any associated write data from the command queue and the write data queue. Furthermore, responsive to such timed out write command, a write error signal or a master interrupt signal may be propagated back to the master device having originated the write command, having requested the write transaction.

For a timed out read command, MPLB interface 213 may be configured to flush the command queue of such read command and generate dummy read data for sending back to the master device having originated the requested transaction for a read. Such dummy read data may be sent back along with a read error signal asserted by MPLB interface 213.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A bridge, comprising:
a slave processor local bus interface;
a crossbar switch coupled to the slave processor local bus interface;
a master processor local bus interface coupled to the crossbar switch;
the slave processor local bus interface, the crossbar switch, and the master processor local bus interface all being part of an embedded core of a host integrated circuit having a core;
the slave processor local bus interface having a slave-side portion coupled to a first portion of the core;
the slave processor local bus interface further having a master-side portion coupled to the crossbar switch;
the master processor local bus interface having a slave-side portion coupled to the crossbar switch;
the master processor local bus interface further having a master-side portion coupled to a second portion of the core;
the slave processor local bus interface and the master processor local bus interface coupled to one another via the crossbar switch for bidirectional communication between the first portion of the core and the second portion of the core to provide the bridge;
the master-side portion of the slave processor local bus interface, the crossbar switch, and the slave-side portion of the master processor local bus interface configured to operate at a first frequency of operation;
the master-side portion of the master processor local bus interface configured to operate at a second frequency of operation that is a first fraction of the first frequency of operation; and
the slave-side portion of the slave processor local bus interface configured to operate at a third frequency of operation that is a second fraction of the first frequency of operation;
wherein the bridge provides rate adaptation for bridging for use of the first frequency of operation which is substantially greater than both the second frequency of operation and the third frequency of operation.

2. The bridge according to claim 1, wherein the second frequency of operation is obtained by dividing the first frequency of operation by a first integer; and wherein the third frequency of operation is obtained by dividing the first frequency of operation by a second integer.

3. The bridge according to claim 2, wherein the first integer is different than the second integer.

4. The bridge according to claim 2, wherein the first integer is equal to the second integer.

5. The bridge according to claim 1, further comprising:
a first arbiter coupled to the slave-side portion of the slave processor local bus interface for conversion of a first data bus width of a master device instantiated in programmable logic fabric to a native bus width of the crossbar switch as part of the rate adaptation, the master device being coupled to the slave-side portion of the slave processor local bus interface via the first arbiter.

6. The bridge according to claim 5, further comprising:
a second arbiter coupled to the master-side portion of the master processor local bus interface for conversion of a second data bus width of a slave device instantiated using the programmable logic fabric to the native bus width of the crossbar switch as part of the rate adaptation, the slave device being coupled to the master-side portion of the master processor local bus interface via the second arbiter.

7. The bridge according to claim 6, wherein the first data bus width and the second data bus width are the same.

8. The bridge according to claim 6, wherein the first data bus width and the second data bus width are different.

9. The bridge according to claim 6, wherein:
the slave processor local bus interface includes first separate read data and write data first-in, first-out buffers, a first portion of each of which is located in the slave-side portion of the slave processor local bus interface and a second portion of each of which is located in the master-side portion of the slave processor local bus interface; and
the master processor local bus interface includes second separate read data and write data first-in, first-out buffers, a first portion of each of which is located in the slave-side portion of the master processor local bus interface and a second portion of each of which is located in the master-side portion of the master processor local bus interface.

10. The bridge according to claim 6, wherein the master processor local bus interface is configured to support a timed-out operation of the slave device.

11. The bridge according to claim 6, wherein the slave processor local bus interface is configured to generate at least one command to complete an early terminated burst command of a write burst transfer transaction terminated early by the master device.

12. The bridge according to claim 6, wherein the slave processor local bus interface is configured to flush read data from the slave device responsive to an early terminated burst command of a read burst transfer transaction terminated early by the master device.

13. The bridge according to claim 1, wherein the first portion and the second portion of the core are separate circuits coupled to one another via the bridge.

14. The bridge according to claim 13, wherein both the first portion and the second portion of the core are instantiated in programmable logic fabric.

15. A bridge, comprising:
a slave processor local bus interface;
a crossbar switch coupled to the slave processor local bus interface and a microprocessor, the microprocessor having a first frequency of operation; and
a master processor local bus interface coupled to the crossbar switch, the slave processor local bus interface and the master processor local bus interface being coupled to one another via the crossbar switch for bidirectional communication between a first portion of configurable logic blocks of a host integrated circuit and a second portion of the configurable logic blocks by way of programmable interconnect elements to provide the bridge, wherein the programmable interconnect elements are configured by bits which control the programmable interconnect elements;
wherein the slave processor local bus interface, the crossbar switch, the master processor local bus interface, and the microprocessor are a part of an embedded core of the host integrated circuit having the configurable logic blocks;
wherein the slave processor local bus interface operates at a second frequency which is user selectable and based upon the first frequency and has first pipelining channels comprising a read data buffer and a write data buffer enabling the transfer of data between the configurable logic blocks and the crossbar switch; and
wherein the master processor local bus interface has second pipelining channels comprising a read data buffer and a write data buffer enabling the transfer of data between the configurable logic blocks and the crossbar switch.

16. The bridge according to claim 15, wherein the embedded core further comprises a memory controller interface operating at the first frequency.

17. The bridge according to claim 15, wherein the master processor local bus interface operates at the first frequency.

18. A bridge, comprising:
a slave processor local bus interface;
a crossbar switch coupled to the slave processor local bus interface and a microprocessor, the microprocessor having a first frequency of operation; and
a master processor local bus interface coupled to the crossbar switch, the slave processor local bus interface and the master processor local bus interface being coupled to one another via the crossbar switch for bidirectional communication between a first portion of configurable logic blocks of a host integrated circuit and a second portion of the configurable logic blocks by way of programmable interconnect elements to provide the bridge, wherein the programmable interconnect elements are configured by bits which control the programmable interconnect elements;
wherein the slave processor local bus interface, the crossbar switch, the master processor local bus interface, and the microprocessor are a part of an embedded core of the host integrated circuit having the configurable logic blocks;
wherein the slave processor local bus interface operates at a second frequency and comprises first pipelining channels comprising a read data buffer and a write data buffer enabling the transfer of data between the microprocessor and the configurable logic blocks of the host integrated circuit; and
wherein the master processor local bus interface has second pipelining channels comprising a read data buffer and a write data buffer enabling the transfer of data between the microprocessor and the configurable logic blocks.

19. The bridge according to claim 18, wherein the first pipelining channels enabling the transfer of data between the microprocessor and configurable logic blocks comprise first-in first-out inbound registers enabling data from the configurable logic blocks to be accumulated.

* * * * *